US007249356B1

(12) United States Patent
Wilson et al.

(10) Patent No.: US 7,249,356 B1
(45) Date of Patent: Jul. 24, 2007

(54) METHODS AND STRUCTURE FOR BATCH PROCESSING EVENT HISTORY PROCESSING AND VIEWING

(75) Inventors: Grant Wilson, Austin, TX (US); David L. Dietz, Austin, TX (US); Marc Webb, Round Rock, TX (US); Roy Faltesek, Round Rock, TX (US); Muwaffa Lahham, San Francisco, CA (US); John Yiu-Chung Wong, Anaheim, CA (US); Jake Phong Doan, Laguna Hills, CA (US); Robert B. Havekost, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/302,687

(22) Filed: Apr. 29, 1999

(51) Int. Cl.
*G06F 9/46* (2006.01)
*G06F 17/00* (2006.01)
*G06F 15/00* (2006.01)
*G06F 3/00* (2006.01)
*G05B 11/01* (2006.01)
*G05B 19/42* (2006.01)

(52) U.S. Cl. .................. 718/101; 718/100; 700/17; 700/87; 700/239; 700/240; 715/500; 715/700; 715/704

(58) Field of Classification Search .............. 700/7–99, 700/100, 108–118, 121, 239–240; 702/182–187; 709/100–104; 718/100–104; 715/700, 500, 715/704
See application file for complete search history.

(56) References Cited

U.S. PATENT DOCUMENTS 5,014,208 A * 5/1991 Wolfson ..................... 700/99

(Continued)

FOREIGN PATENT DOCUMENTS

DE 0434050 A2 * 6/1991

(Continued)

OTHER PUBLICATIONS

Simensen et al., "A Frame Work For Batch Plant Information Models", Petri Nets Newsletter, 1996, pp. 1-21.*

(Continued)

*Primary Examiner*—Meng-Al T. An
*Assistant Examiner*—Jennifer N. To
(74) *Attorney, Agent, or Firm*—Marshall, Gerstein & Borun LLP

(57) ABSTRACT

A batch event historian gathers, stores and presents data regarding a batch process where relationships among the various elements of data are automatically derived by an executive program. A persistent store includes structure corresponding to the relationships defined among procedural elements and equipment in accordance with batch processing industry S88.01 standards. The executive program gathers event information generated by the batch process and derives the relationships among the events in accordance with these industry standard models. Storage and corresponding retrieval and presentation of such historical data is thereby simplified for a user because the user need not manually configure the historian programs to derive the relationships. Association of any continuous data log with event information is automated thereby obviating the need for manual configuration by a user to establish such associations.

31 Claims, 21 Drawing Sheets

U.S. PATENT DOCUMENTS

| | | | | |
|---|---|---|---|---|
| 5,157,595 | A | * | 10/1992 | Lovrenich ....................... 700/7 |
| 5,450,346 | A | | 9/1995 | Krummen et al. ........... 364/468 |
| 5,673,194 | A | * | 9/1997 | Cipelletti et al. ............ 700/115 |
| 5,745,364 | A | * | 4/1998 | Togashi ....................... 700/121 |
| 5,774,875 | A | | 6/1998 | Medeiros et al. |
| 5,870,696 | A | * | 2/1999 | Randolph ................... 702/176 |
| 5,889,674 | A | * | 3/1999 | Burdick et al. ............. 700/121 |
| 5,896,292 | A | * | 4/1999 | Hosaka et al. .............. 700/108 |
| 5,896,294 | A | * | 4/1999 | Chow et al. ................ 700/121 |
| 5,926,186 | A | * | 7/1999 | Itoh et al. ................... 345/619 |
| 5,930,137 | A | * | 7/1999 | Togashi ...................... 700/100 |
| 6,041,178 | A | * | 3/2000 | Rybarczyk et al. ......... 717/109 |
| 6,078,924 | A | * | 6/2000 | Ainsbury et al. ........... 707/101 |
| 6,289,368 | B1 | * | 9/2001 | Dentler et al. .............. 709/101 |
| 6,363,294 | B1 | * | 3/2002 | Coronel et al. ............. 700/121 |
| 6,385,494 | B1 | * | 5/2002 | Blahnik et al. ............... 700/86 |
| 6,438,436 | B1 | * | 8/2002 | Hohkibara et al. ........... 700/97 |
| 6,522,939 | B1 | * | 2/2003 | Strauch et al. .............. 700/116 |
| 6,584,501 | B1 | * | 6/2003 | Cartsonis et al. ........... 709/224 |
| 6,836,894 | B1 | * | 12/2004 | Hellerstein et al. ......... 719/318 |
| 6,938,262 | B2 | * | 8/2005 | Bao et al. ................... 719/329 |

FOREIGN PATENT DOCUMENTS

| | | |
|---|---|---|
| EP | 0487419 A2 | 5/1992 |
| EP | 0 745 916 A1 | 4/1996 |
| EP | 0 825 506 A2 | 2/1998 |
| JP | 7114601 A1 | 5/1995 |
| JP | 8328608 A1 | 12/1996 |
| JP | 10228312 A1 | 11/1998 |

OTHER PUBLICATIONS

Author Unknown; "NT-Based Recipe Provides Graphical Editor and Simplified Integration"; CONTROL Magazine; Sep. 1997; pp. 146-147.

Author Unknown; "SP88 Reduces Batch Variation"; Online Posting; <http://www.controlmagazine.com/0897/c0740897.html>.

Piper, Peggy; "Distributed Control Systems Spread Out"; Online Posting; <http://www.controlmagazine.com/0697/c0370697.html>.

Johnson, Dick; "Distributed Control: A View of What's New"; Online Posting; Control Engineering Online; Sep. 1996; <http://www.manufacturing.net/magazine/ce/archives/1996/09/issues/na/09a700.htm>.

Nomikos et al., "Multi-Way Partial Least Squares in Monitoring Batch Processes", 1995, *Chemometrics and Intelligent Laboratory Systems*, vol. 30, No. 1, pp. 97-108.

Nomikos, "Detection and Diagnosis of Abnormal Batch Operations Based on Multi-Way Principal Component Analysis", *ISA Transactions*, 1996, vol. 35, No. 3, pp. 259-166.

Kourti et al., "Process Analysis Monitoring and Diagnosis, using Multivariate Projection Method", *Chemometrics and Intellingent Laboratory Systems*, 1995, vol. 28, No. 1, pp. 3-21.

Rosenof, "Data Logging and Reporting for Effective Batch Control", *The Industrial and Process Control Magazine*, Jul. 1985, vol. 58, No. 8, pp. 29-32.

Search Report under Section 17(5) issued in GB application No. GB 0010257.4 on Dec. 22, 2000.

Examination Report under Section 18(3) issued in GB application No. 0010257.4 on Sep. 16, 2004.

* cited by examiner

FIG. 14

Batch History View - [EE_19981019.009 - Batch Events]
File Edit View Batch Process Graph Events Applications Window Help

| | Event Type | Event Desc | Time | Process Cell | Unit | Phase Module |
|---|---|---|---|---|---|---|
| 1 | State Change | State Changed: IDLE | 10/18/98 08:04:09 | PAINT_BLEND | BLENDER_600 | CHGC_BLND600 |
| 2 | State Change | State Changed: COMPLETE | 10/18/98 08:04:09 | PAINT_BLEND | BLENDER_600 | CHGC_BLND600 |
| 3 | Report | ACTUAL_CHARGE_0.0 gal | 10/18/98 08:04:06 | PAINT_BLEND | BLENDER_600 | CHGC_BLND600 |
| 4 | Phase Link Permissive Sent | 1 0 0 0 0 0 Msg Num: 3 with Wait | 10/18/98 08:04:02 | PAINT_BLEND | BLENDER_600 | CHGC_BLND600 |
| 5 | Phase Link Permissive Sent | 1 0 0 0 0 0 Msg Num: 2 with Wait | 10/18/98 08:03:59 | PAINT_BLEND | BLENDER_600 | CHGC_BLND600 |
| 6 | Phase Link Permissive Sent | 1 0 0 0 0 0 Msg Num: 1 with Wait | 10/18/98 08:00:41 | PAINT_BLEND | BLENDER_600 | CHGC_BLND600 |
| 7 | Param Download Verified | CHARGE_AMOUNT 0.0 | 10/18/98 08:00:37 | PAINT_BLEND | BLENDER_600 | CHGC_BLND600 |
| 8 | Recipe Value | CHARGE_AMOUNT 0.0 gal | 10/18/98 08:00:37 | PAINT_BLEND | BLENDER_600 | CHGC_BLND600 |
| 9 | State Change | State Changed: RUNNING | 10/18/98 08:00:37 | PAINT_BLEND | BLENDER_600 | CHGC_BLND600 |
| 10 | State Change | State Changed: IDLE | 10/18/98 08:00:36 | PAINT_BLEND | BLENDER_600 | CHGC_BLND600 |
| 11 | State Change | State Changed: IDLE | 10/18/98 08:00:36 | PAINT_BLEND | BLENDER_600 | CHGC_BLND600 |
| 12 | State Change | State Changed: COMPLETE | 10/18/98 08:00:35 | PAINT_BLEND | BLENDER_600 | CHGC_BLND600 |
| 13 | Report | ACTUAL_CHARGE_0.0 gal | 10/18/98 08:00:33 | PAINT_BLEND | BLENDER_600 | CHGC_BLND600 |
| 14 | Phase Link Permissive Sent | 1 0 0 0 0 0 Msg Num: 3 with Wait | 10/18/98 08:00:29 | PAINT_BLEND | BLENDER_600 | CHGC_BLND600 |
| 15 | Phase Link Permissive Sent | 1 0 0 0 0 0 Msg Num: 2 with Wait | 10/18/98 08:00:21 | PAINT_BLEND | BLENDER_600 | CHGC_BLND600 |
| 16 | Phase Link Permissive Sent | 1 0 0 0 0 0 Msg Num: 1 with Wait | 10/18/98 08:00:19 | PAINT_BLEND | BLENDER_600 | CHGC_BLND600 |
| 17 | Param Download Verified | CHARGE_AMOUNT 5.0 | 10/18/98 08:00:15 | PAINT_BLEND | BLENDER_600 | CHGC_BLND600 |
| 18 | Recipe Value | CHARGE_AMOUNT 5.0 gal | 10/18/98 08:00:15 | PAINT_BLEND | BLENDER_600 | CHGC_BLND600 |
| 19 | State Change | State Changed: RUNNING | 10/18/98 08:00:15 | PAINT_BLEND | BLENDER_600 | CHGC_BLND600 |
| 20 | State Change | State Changed: IDLE | 10/18/98 08:00:14 | PAINT_BLEND | BLENDER_600 | CHGC_BLND600 |
| 21 | State Change | State Changed: IDLE | 10/18/98 08:00:14 | PAINT_BLEND | BLENDER_600 | CHGC_BLND600 |
| 22 | State Change | State Changed: COMPLETE | 10/18/98 08:00:13 | PAINT_BLEND | BLENDER_600 | CHGC_BLND600 |
| 23 | Report | ACTUAL_CHARGE_0.0 gal | 10/18/98 08:00:11 | PAINT_BLEND | BLENDER_600 | CHGC_BLND600 |
| 24 | Phase Link Permissive Sent | 1 0 0 0 0 0 Msg Num: 3 with Wait | 10/18/98 08:00:07 | PAINT_BLEND | BLENDER_600 | CHGC_BLND600 |
| 25 | Phase Link Permissive Sent | 1 0 0 0 0 0 Msg Num: 2 with Wait | 10/18/98 07:59:46 | PAINT_BLEND | BLENDER_600 | CHGC_BLND600 |
| 26 | Phase Link Permissive Sent | 1 0 0 0 0 0 Msg Num: 1 with Wait | 10/18/98 07:59:46 | PAINT_BLEND | BLENDER_600 | CHGC_BLND600 |
| 27 | Param Download Verified | CHARGE_AMOUNT 85.0 | 10/18/98 07:59:42 | PAINT_BLEND | BLENDER_600 | CHGC_BLND600 |
| 28 | Recipe Value | CHARGE_AMOUNT 85.0 gal | 10/18/98 07:59:42 | PAINT_BLEND | BLENDER_600 | CHGC_BLND600 |
| 29 | State Change | State Changed: RUNNING | 10/18/98 07:59:42 | PAINT_BLEND | BLENDER_600 | CHGC_BLND600 |
| 30 | State Change | State Changed: IDLE | 10/18/98 07:59:41 | PAINT_BLEND | BLENDER_600 | CHGC_BLND600 |

Record 30

1400

METHODS AND STRUCTURE FOR BATCH PROCESSING EVENT HISTORY PROCESSING AND VIEWING

BACKGROUND OF THE INVENTION

1. Field of the Invention

The present invention relates to process control systems and applications and more specifically relates to methods and associated structures for gathering and presenting historical data regarding a real-time batch process and for associating such data with recipes, procedures and equipment used in the batch process.

2. Discussion of Related Art

Batch Processing

There are many types of industrial processes. Some run continuously until stopped, typically producing very large quantities of product between start-up and shutdown. Other industrial processes operate on groups of parts, with the group moving as a unit between workstations but with each part maintaining its own unique identity.

A third type of industrial process is the batch process, which involves subjecting raw materials to processing steps using one or more pieces of equipment to produce a "batch" of product. Cooking is an example of a batch process practiced in the home. Raw food is prepared, is placed in a pan, is cooked for a time specified by a recipe, and ends up as a dish or "batch" ready for eating.

Preparation of polyvinyl chloride is an example practiced on an industrial scale. Polyvinyl chloride is made by polymerizing or "joining together" much smaller molecules of vinyl chloride. This is accomplished by filling a batch reactor to the appropriate level with a mixture of vinyl chloride, solvent and polymerization inducer, heating the mixture in the reactor, cooling the resulting batch, and purifying the batch by removing leftover starting materials.

These are but a few examples of batch processes. In general, there are many different kinds of batch processes. They may include, for example, product manufacturing, distribution, and testing as well as several other product and non-product oriented processes.

Batch Process Control

Generally speaking, it is important to control a batch process. For one example, if a dish is left on the stove for too long during cooking, it will burn and the resultant batch of food will be ruined. For another example, if a reaction mixture of vinyl chloride is not reacted long enough, the yield of polyvinyl chloride from the process will be inadequate and money will be lost. Control of a batch process can become critical where production of dangerous chemicals or comparable entities is involved.

One way to control a batch process is manually. That is, one or more workers are assigned the job of watching all aspects of batch process to be sure that everything is proceeding according to plan. However, this is tedious work, and errors can creep in unnoticed.

For these and other reasons, workers in the field of batch control have been trying for some time now to automate the control of batch processes by using electronic devices. Computers, programmable controllers and comparable electronic devices have been used in conjunction with intelligent field devices (i.e., intelligent sensors and controllable valves) by a number of batch control system suppliers to automate the control of batch processes.

An intelligent sensor is typically placed on a piece of equipment and reports on equipment conditions to a central control room in the plant. A controllable valve typically controls the input to, or output from, a piece of equipment, and can be controlled from a central control room, often based on information received from an intelligent sensor.

Efforts to automate batch processing have led to the formation of standards committees by members of industries involved in batch processing and suppliers of batch processing equipment, among others. The general purpose of these standards committees has been to define uniform standards for automated batch processing.

One such standard has been promulgated by the International Society for Measurement and Control, an international organization concerned with issues of process control. This standard is entitled *Batch Control Part 1: Models and Terminology* and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Procedural Model

Batch-processing equipment (i.e., controllable elements such as valves, heaters, mixers, etc.) is operated according to procedures to make a batch. For purposes of this application, all such equipment is referred synonymously to as equipment, equipment modules, processing equipment, or physical element. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. The levels of the S88.01 procedural model of particular interest for purposes of this application are, in descending order:

the "procedure"
the "unit procedure"
the "operation"
the "phase"

The term "procedural element" is used in this application to refer to any embodiment or implementation of any of these levels of the S88.01 procedural model, not just to those of the "procedure" level or any other single level of the procedural model.

The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

Linkage of Physical and Procedural Elements

In general, procedural elements are implemented as computer programs that are executed by and within data-processing devices, including personal computers, workstations, and programmable controllers. Execution of a typical procedural element results in an electrical or optical output from the data-processing device that can be used to control a physical element, typically by connecting an output of the data-processing device to the physical element directly, or indirectly over a local-area or wide-area network.

A procedural element performs its assigned task by invoking "basic control" with respect to at least one physical element. This type of control is dedicated to establishing and maintaining a specific desired state of the physical element. Basic control would, for example, start or maintain a flow of material in a storage bin element or heating of starting materials in a polyvinyl chloride reactor element.

In practice, the lower levels of the procedural model (namely phases) perform the actual communications with the actual physical elements thereby invoking or performing basic control. The higher levels of the procedural model are essentially abstractions to improve organization and structure of the procedural model, and the physical model as well.

Procedural Elements and the State Machine Model

A state machine model is a logical construct commonly used to describe the state of a process or activity. The model describes or defines a number of process states, together with actions that cause transitions between those states. A state machine model of a process is said to be in a particular state due to an earlier transition into that state. When a particular event occurs or a particular status is sensed, the state machine model makes a transition to another state corresponding to the particular event or sensed status.

A state machine model is a useful technique for defining and implementing the operation of a procedural element of a batch process. A procedural element defined and implemented as a state machine initiates an action, for example, when its associated state machine makes a transition from an old state to a new state.

The S88.01 standard permits definition and implementation of procedural elements in accordance with a standard state machine model. While the S88.01 standard does not mandate this approach, it has been broadly adopted in the process control industry to enable a higher degree of interoperability among the products of various vendors (as explained further below). One present commercial application of the S88.01 standard having procedural elements defined and implemented according to a state machine model is the DeltaV Batch product from Fisher-Rosemount Systems, Inc. at 83.01 Cameron Road, Autsin, Tex. 78754.

In DeltaV Batch, a server program runs on the data processing device that executes procedural elements. The server program coordinates execution of procedural elements in accordance with one or more state machine models. Procedures, corresponding unit procedures, corresponding operations, and corresponding phases are sequenced through their respective steps by the server program.

When a phase is initiated by the server program, for example, the phase communicates the initiation request to the phase logic interface within a programmable controller. The programmable controller then executes the actual state logic for the phase and provides the required process control through communications to the process equipment.

Historical Data

In such batch processes, it is desirable to gather data representative of the historical events that make up the processing of a batch. Such historical data may be useful, for example, in determining trends in quality control or for determining when equipment used in the batch process is in need of service.

A number of types of data are potentially useful in reviewing the quality or progress of a batch process. One such source of data is continuous data generated by the various data points in the batch process during the processing of the batch. A data point is a single source of such continuous data that reflects some control value or other status or measurement of the batch process. For example, a particular level of a material flow or a temperature as measured by a sensor might be one such data point. A present setting of a control valve would be another such exemplary data point.

Each such data point generates a continuous stream of data values sensed or controlled over time by the batch process application. The aggregation of all such continuous data, generated during processing of a batch, is often logged by a batch processing system. Log records of such data points usually include a timestamp and a present value along with other identifying information for the data point such as a tag to identify the source of the data.

Another type of data useful in reviewing the quality or progress of a batch process is event information. Event information, as used herein, refers to information that describes the batch process in terms of procedural model execution. For example, batch events that describe the start and end time of a particular phase or a particular operation, unit procedure or procedure of the procedural model constitute such event information. Event information also includes process events—information generated by the physical elements of the batch process or by an operator. Each equipment module, cell, etc. may generate process events to indicate its specific activity in starting and stopping a particular phase (i.e., performing specific basic control actions). Alarm conditions recognized by the equipment are further examples of process events. Process events may also include information regarding operator changes to the batch process during its operation.

It is most useful to integrate these various forms of event information and continuous data to provide a comprehensive, understandable presentation of such information to a user of the batch process. However, presently available tools for reporting on batch process quality and progress fall far short of such integration. A user is required to perform the "integration" manually using a variety of disjoint tools. Further, to the limited extent present solutions do provide such integration, a user is required to provide significant, detailed configuration information to permit the reporting programs to correlate the various types and sources of event information and continuous data.

Present tools used in batch processing gather continuous data from the batch process. Other tools then provide the user with a cumbersome interface to locate particular sections of interesting data. For example, a user may use an indexing tool to define a filter or trigger that locates captured data relating to a particular event or procedure in the batch process. The filter or trigger may be, for example, as simple as defining a start and end time for data relating to execution of a particular phase. Or the definition may be more complex requiring the user to identify other parameters that identify data corresponding to a particular procedural element.

In general, the user must manually provide configuration information to define events of interest in the batch process. The configuration of this information often presents a complex task requiring significant user knowledge of the events of interest and the likely characteristics of data relevant to those events of interest. Further, regardless of the complexity of defining the filter for associating data with a procedural event, the process of defining such filters to associate data with batch events is a largely manual process as presently practiced in the art. Essentially the user must enter configuration data that identifies a particular event and particular portions of continuous data associated with that event. Such manual processes are prone to error such that the relationships between event information and related continuous data may be incorrectly established.

The user of the data requires knowledge of the structure of the stored data and is responsible for generating meaningful relationships among the data for their presentation. Though the query capabilities of the existing techniques may be significant, they provide little more than a relational database "front-end" for accessing data. Such relational database management system query operations still require a user to understand relationships among the various elements of stored data and to create therefrom meaningful queries for presentation of desired data.

Another problem with present batch processing tools arises in the presentation of such event information to a user. A batch historian program is one that gathers and presents such event information to a user of a batch processing system. Present batch historian programs produce tabular, textural reports from the continuous data or, at best, produce simple linear graphs of trends in elements of the continuous data. Present batch historian features of batch processing systems therefore provide limited flexibility in presentation of data to a user. For example, the relationships among batch events or process events and continuous data is difficult to discern from the tabular, textural presentations of present historian programs.

It is therefore a problem to provide methods and structures that automate the process of establishing relationships between the various sources of event information and any continuous data gathered from the batch process. An improved structure is needed that both automates and simplifies the establishment of relationships among the various gathered events and data. It is further desirable that improved methods and structures provide improved flexibility in the presentation of gathered data to enable better analysis of data by users of the batch processing system.

SUMMARY OF THE INVENTION

The present invention solves the above and other problems, thereby advancing the state of the useful arts, by providing methods and associated structures for more effectively capturing, storing and presenting historical data regarding a batch process. In particular, the batch historian of the present invention includes an executive program that receives all event information generated by a batch process. The executive program analyzes the data to determine when the events received reflect instantiation of a new batch or a new procedural element within the processing of a batch. Such analysis therefore determines relationships among the various events received to reconstruct the relationships between a batch and the batch processing associated with that batch. The events and the relationships among the events is therefore derived automatically from the gathered batch events and process events.

Events so identified by the analysis of the executive program can then be used to automatically associate logged continuous data with event information derived by the executive program. Continuous data logs can be parsed using the event information derived by the history executive program and displayed in a form that relates it to the event information.

The present invention therefore automatically determines relationships between various batch events generated from the procedural model server processing as well as process events generated by physical elements actually performing the desired control. The present invention also automatically associates this derived event information with continuous data logged by other components of the batch processing system. The present invention therefore obviates the need for user manual configuration of the system to identify batch events and to associate such events with other process events or with continuous data.

In the preferred embodiment, the derived event information is stored in an object oriented persistent storage (i.e., an Object Oriented Database Management System or OODBMS). This storage approach improves the flexibility for a user to generate ad-hoc inquiries of the gathered and derived data to better understand the historical sequence of events and the relationships among the various events. As noted herein below, those skilled in the art will recognize that any of several file or database structures may be employed in conjunction with the present invention to persistently store the data. An OODBMS is but one such structure that provides significant flexibility to the batch history features of the present invention.

The present invention further provides a graphical user interface view client program that allows the user to view the structured historical data in a manner that reflects the hierarchical relationships of the gathered data. The various gathered data and the events they represent are presented to the user in such a manner as to allow navigation among the various relationships of the data. For example, information regarding a particular procedural element of the processing of a batch may be presented to the user and the user may click on the graphical display elements to view the related lower level procedural aspects such as a specific phase. The user readily views the various relationships among the objects that comprise the batch processing and particular manufactured batches.

In the preferred embodiment, the view client presents a batch process on a display screen as a Gantt chart timeline graphically showing the various procedures performed to make the batch and times associated with each procedural element. To view lower level (hierarchical) details of a procedure, the user "clicks on " (selects) a procedure to view unit procedures within. In like manner, a unit procedure is clicked to view operations and an operation is selected to view phases. A tabular textural portion of the screen below the Gantt chart reveals details of the events that comprise the selected procedural element. Multiple levels of the procedural model hierarchy may be simultaneously displayed on the Gantt chart portion of the display. A user may configure the level of detail to be so displayed.

A first and second batch may be simultaneously displayed by the view client to permit visual comparisons of two batches. For example, a "golden" batch that produces desired product may be compared to a failed batch. Often the reason for failure of the batch is visually evident from the graphical comparison of the batch Gantt charts. Features of the view client allow timelines for each Gantt chart to be presented in absolute time or in batch relative time to permit the charts to visually align better. The timelines may be aligned at the batch start or may be aligned at any other defined procedural event in both timelines (i.e., the start or end or a particular procedural element common to both timelines).

Graphical user interface features of the view client also allow a user to easily review continuous data associated with a selected procedural element. The relationships automatically determined by the present invention correlate logged continuous data with particular procedural elements. The view client allows one or more tagged data points in the continuous logged data to be presented for any particular procedural element. For example, one or more tagged data point values may be displayed and/or plotted for a particular selected phase of a batch. The desired phase is selected and a dialog box allowing the user to select tagged data point for that phase is presented. The selected tagged data points for the phase are then retrieved from the log of continuous data and presented on the user's display. Key to the invention is that the user need not specify the start and end of each procedural element in manually entered configuration information as is presently practiced in the art. Rather, the user merely selects a procedural element from the graphical display and the methods and structures of the present invention associate the selected procedural element with event information for that procedural element and other related events, procedural elements and equipment.

Further features of the view client allow either event data (i.e., Gantt charts) or plotted continuous data to be monitored in real time. This real time display of the data scrolls the chart or plot across the screen to add new data to the end of the chart or graph as the bath process is executing.

The above and other objects, aspects, features, and advantages of the present invention will become apparent from the following description and the attached drawing.

BRIEF DESCRIPTION OF THE DRAWINGS

FIGS. 10 through 21 are exemplary display screens generated by the batch event history view client of FIG. 9.

DETAILED DESCRIPTION OF THE PREFERRED EMBODIMENTS

Figure 1:
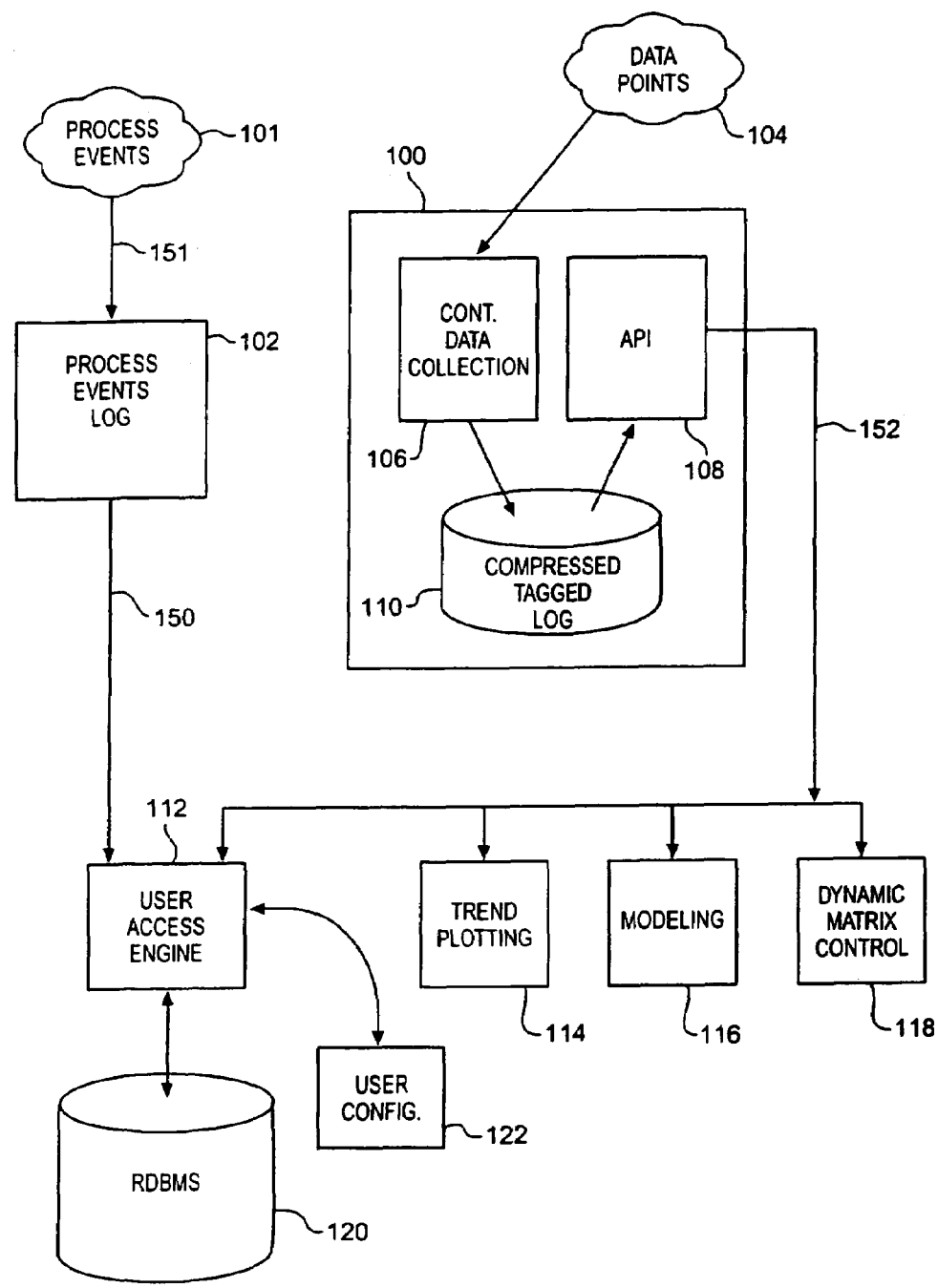
FIG. 1 is a block diagram depicting the present state of the art of batch history logging and reporting systems.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Batch Event Historian System

FIG. 1 is a block diagram depicting the presently known state of the art for recordation and presentation of historical data relating to a batch processing environment. A continuous data log 100 records tagged information corresponding to a multitude of continuous data sources in the batch processing environment. In particular, continuous data collection element 106 receives present a stream of continuous values from each of a plurality of data points 104. Such data points include, for example, present analog and digital values from sensors and actuators involved in the batch process. Each data value so received is tagged with identification and other information (i.e., time stamp values) to allow the data point value to be sorted or associated with like data points from the same source. The tagged data point values are then compressed and stored in a compressed tagged log 110 for later processing.

This compressed, tagged data is retrieved via Application Program Interface (API) 108 for use by client applications 114 through 118 and user access engine 112. API 108 provides simple filtration and selection of desired data point values from the compressed, tagged log 110. Values tagged with the same source identification may be decompressed and retrieved from the log for a selected range of timestamp values.

Standard data reduction and analysis client applications 114 through 118 provide static analysis of particular data points by retrieval and analysis of the compressed, tagged data point values. The range of values to be analyzed is supplied by the user by identifying the tag of the data point(s) and the range of timestamps of interest.

User access engine 112 provides a user with more flexible ad-hoc inquiry into the compressed tagged data point values. A user first supplies configuration data 122 to describe relationships among the various data sources and times associated with start and stop of each batch procedural step. In other words, a user must manually define the start and stop of each procedural event (phase, operation, unit procedure and procedure) so that user access engine 112 may determine relationships among the various compressed tagged data point values and the batch procedure that operated to produce the associated batch.

User access engine 112 uses this user configuration data 122 to structure a traditional relational database management system 120 for storing these relationships among the various user defined procedural events.

Process events 101 are indicative of real time events generated by the process equipment and operators during the processing of a batch. These events also include timestamp information as well as identification information indicative of the equipment or operator that generated the message are logged in process event log 102 and also provided to user access engine 112 for determination of other relationships among these events.

Key to the prior techniques is the user configuration information 122. The user is responsible for manually identifying the procedural events that tie the real time process events and continuous data to the S88 procedural model. In other words, to view the process events and continuous data in a manner that is linked to the batch processing procedural model most familiar to the user, the user must supply timing information to identify the various procedural events. Manual procedures such as this are cumbersome to the user and prone to error. Erroneous user configuration data leads to less meaningful presentation of the data as it relates to procedural events in the batch process.

Figure 2:
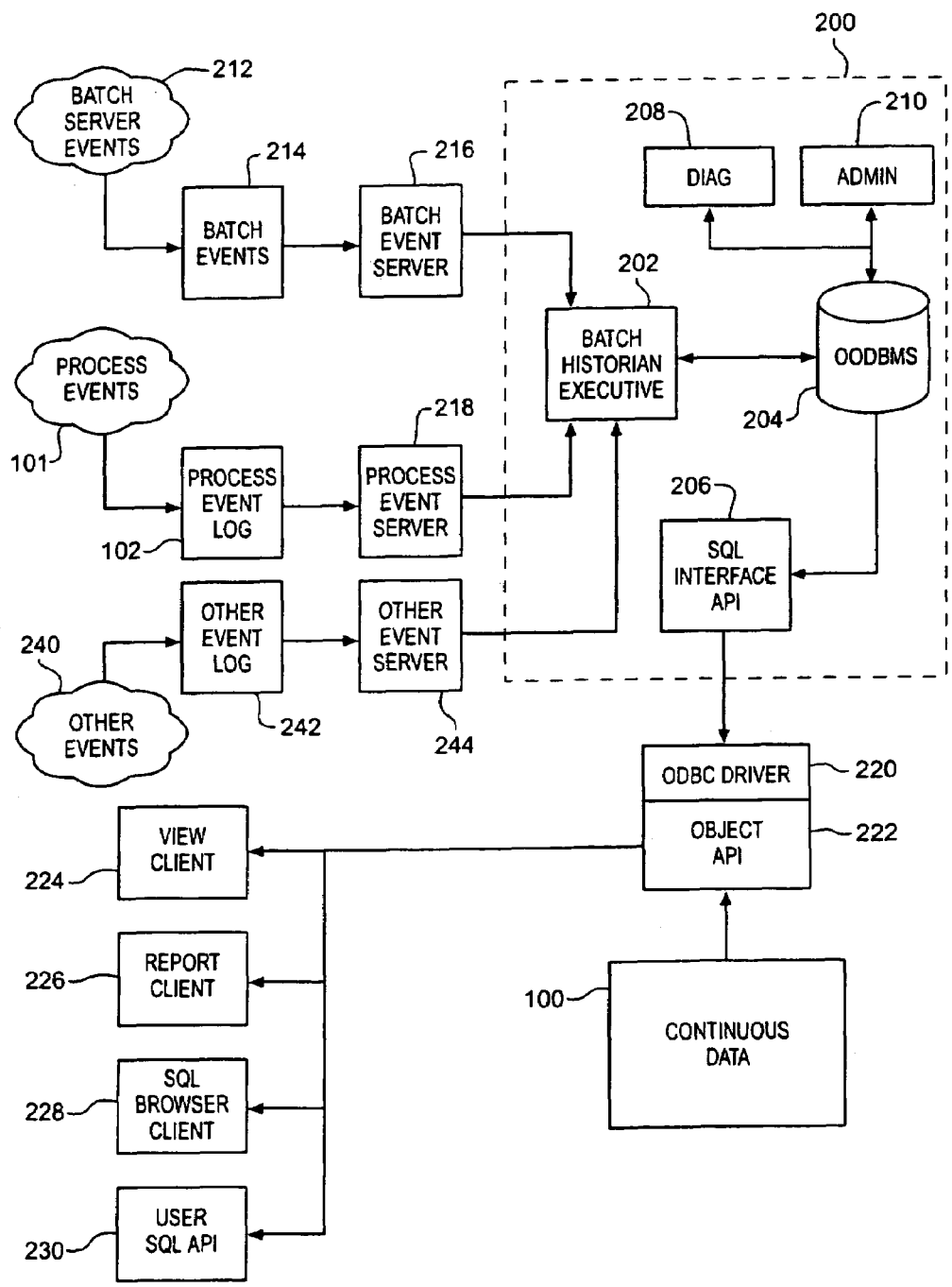
FIG. 2 is a block diagram depicting an architecture including a batch event historian in accordance with the present invention.

By contrast, FIG. 2 shows the present invention that includes a batch event historian 200 for storing and retrieving event information regarding a batch process so as to automate the determination of relationships between the gathered process event data, batch procedural events, and associated continuous data. By so automating the determination of such relationships, the present invention obviates the requirement of prior techniques to manually configure such event timing information. The cumbersome burden imposed on users by prior techniques to configure such events and the induced errors resultant from such manual procedures are eliminated.

In particular, batch event historian 200 includes batch historian executive 202 that receives event information from multiple data sources and determines relationships among the various elements of gathered event data. Still more specifically, in the preferred embodiment, executive 202 receives process events 101 via process event log 102 and process event server 218. As noted above, process events are generated by physical equipment and/or operator interaction with the batch (not shown). Process event log 102 therefore represents a buffer (i.e., an inter-process communication FIFO or pipe) for buffering such events to be processed by process event server 218. Executive 202 also receives batch server events (also referred to as procedural events) 212 via batch events 214 and batch event server 216. As above, batch events 214 are generated by a batch server process (not shown) which performs the batch process. Batch events 214 therefore represents a buffer (i.e., inter-process communication FIFO or pipe) for buffering such events to be processed by batch event server 216.

Process event server 218 and batch event server 216 are present in the preferred embodiment to provide a common inter-process communication interface between executive 202 and its attached data sources batch events 214 and process events log 102. Those skilled in the art will recognize many equivalent software structures to permit executive 202 to gather data from a variety of data sources having potentially different data formats. The preferred embodiment shown in FIG. 2 is intended therefore as exemplary of one such design choice to enable a single common interface between executive 202 and a variety of data sources. Further, those skilled in the art will recognize that any number of data sources may be so integrated by executive 202 so as to determine event relationships therebetween. In the preferred embodiment, each data source is associated with a server process to translate the data source into a canonical format and to provide such canonical data to the executive via well known inter-process communication techniques.

The structure and methods of the present invention are intended to allow attachment of an arbitrary number of data sources to the batch historian executive 202. Other events 240 is therefore representative of such an other type of event to be recorded in the persistent store and related to the batch processing hierarchy or procedural elements and physical elements. A log 242 of such other events serves to buffer the generation of such events for processing. Other event server 244 then processes the logged other events and provides them to executive 202 for persistent storage. Those skilled in the art will recognize that any number of such data source may be attached to the executive 202. Each is associated with a server process that converts the logged event information into the canonical format specified for input to the executive 202.

Executive 202 reconstructs the batch process procedural hierarchy of executed procedural events from event messages received from the batch server 212. The batch server 202 generates a message when each procedural element is executed on behalf of a particular identified batch. The event information in such messages includes identification information to identify the particular procedural element and the time of the event. Events include starting of the procedural element, stopping, pausing, aborting, etc. Essentially all state transitions of the procedural model of the S88 standard cause the generation of an event information message and transmission of the message (via batch event server 216) to executive 202. All other event messages are related to the procedural hierarchy reconstructed by the executive 202.

Executive 202 stores objects in DB 204 reflecting the reconstructed batch process procedural execution. Executive 202 inspects all such gathered event information from its attached data sources and determines whether the batch events referenced therein ae already known to the executive. Such events are known to the executives essentially when they are found to be previously stored as objects in DB 204. Where new batch events are detected, appropriate descriptive objects are generated and stored in DB 204. Where, for example, a phase is stated, an object for that phase including all identification information and timestamp information is generated and stored. If the phase relates to an operation that is already known in the DB 204, then those relationships are established. If the operation (or unit operation or procedure) is not presently known, then other objects are generated and stored in the DB 204 to reflect these higher levels of the procedural hierarchy execution. Receipt of each batch event message via batch event server 216 therefore provides event information that permits executive 202 to reconstruct the batch procedure execution.

Executive 202 also stores process events 101, received via process event log 102 and process event server 218, in DB 204. Relationships between the batch events and the process events are thereby automatically created and retained in the DB 204 without need for manual user configuration.

Object API 222 provides an object oriented programming interface for user access to the event information and derived relationships stored in DB 204. In the preferred embodiment, batch event historian 200 provides a Structured Query Language (SQL) interface 206 for external access to the information stored in DB 204. Object API 222 therefore accesses DB 204 via Open Database Connectivity (ODBC) driver 220 and SQL interface 206. This structure makes the underlying persistent store largely transparent to the user or application client programs. The persistent store may be implemented as depicted in the preferred embodiment of FIG. 2 using OODBMS technology. Or, in view of the hidden underlying structure, the persistent store may be implemented using standard relational model database management packages or any other structured storage subsystem DB 204. For purposes of further discussion herein, DB 204 is referred to synonymously as persistent store, persistent storage, object store and other variants thereof to stress that the storage architecture may be structured in any of several well known manners using any of several commercially available storage management tools. Key to the invention is the function of the executive 202 to derive the relationships among batch events and other gathered data and the API 222 which transparently access such event information and related continuous data on the user's behalf.

Exemplary user applications 224 through 230 access the information in the persistent storage using object API 222. View client 224 is an exemplary user application that provides a standardized hierarchical view of the acquired historical data. View client 224 is discussed in further detail herein below. Report client 226 is an exemplary user application that produces standardized reports from the historical data. Such standard reports may include, for example, quality assurance related reports to monitor quality of the batches produced and the equipment used in the batch process or standard status reports as to the progress of particular batch processes. SQL browser client 228 is an exemplary user application that provides an SQL standard query interface for a user to browse information stored in the persistent storage. Similarly, user SQL API 230 is an exemplary user application that permits other user generated application processes to access the persistent storage using standard query programming interfaces. Those skilled in the art will recognize that exemplary user applications 224 through 230 are intended merely as examples of common application programs that may utilize data in the persistent storage. Those skilled in the art will recognize a variety of similar applications that could utilize this standard interface to the data in the persistent storage.

A further function of object API 222 is to provide a standard interface for user access to continuous data 100. Object API 222 permits the user to access continuous data 100 transparently as though it is integrated and related with objects in DB 204. In other words, object API 222 permits a user to freely intermix access process events, related batch events and related continuous data as though all data were stored in a single database. Directing access of the user to the proper persistent store (i.e., DB 204 or continuous data 100) and determining all relations necessary to associate the data with a user's request is handled with a common user interface by object API 222. A user may specify a particular batch event and access therefrom all related batch events (hierarchically related procedural elements), all related process events and all related continuous data. The relationships among the various data is automatically determined by the executive 202 and the object API 222 of the present invention.

Diagnostic interface 208 and administrative interface 210 provide administrative user interfaces for managing the persistent store (DB 204). In particular, requests which startup or shutdown the historian processing or which reconfigure the persistent store (i.e., resize DB 204 or add/remove/modify information about data sources) are generated by a user through diagnostic interface 208 and/or administrative interface 210.

The administrative interface 210 also controls executive 202 archival features. The executive 202 can controllably perform batch based backups. A batch based backup is one that backs up all event information in the persistent store related to processing of a particular batch. The backup may be created in another section of DB 204 to save it for other processing. These backup sections of the persistent store may be "detached" from DB 204 for offline processing. Essentially the administrative interface 210 instructs the executive 202 to make a "snapshot" of all event information for one or more identified batches. The snapshot may then be copied to a safe backup using offline processing techniques. Such archived (snapshot) event information may then be deleted from the persistent store to make room for further batch history information. At a later time, an earlier archive may be restored (re-attached) to DB 204 to permit the data to be viewed and manipulated again. Deletion and restoration of such archived information is also performed by control of the administrative interface 210 that, in turn, controls the executive 202.

Those skilled in the art will recognize that diagnostic interface 208 and administrative interface 210 are not essential components of batch event historian 200. A variety of equivalent structures may be employed as a matter of design choice by those skilled in the art. Or, for example, the batch event historian 200 may statically configure the persistent storage and/or may run without a user interface to start and stop its operation. Such archived (snapshot) event information may then be deleted from the persistent store to make room for further batch history information. At a later time, an earlier archive may be restored (re-attached) to DB 204 to permit the data to be viewed and manipulated again.

Deletion and restoration of such archived information is also performed by control of the administrative interface 210 that, in turn, controls the executive 202.

Those skilled in the art will recognize that the architecture of batch event historian 200 and related object API 222 is intended as exemplary of one preferred embodiment of the present invention. Numerous variations of the architecture will occur to those skilled in the art. For example, continuous data 100 could be merged within DB 204 where existing installed systems (commonly referred to as legacy systems) are not involved providing persistent storage logging of such information. Or, for example, the persistent store for event information may be other than an object oriented data store. Or by way of further example, batch executive 202 may directly access the various input sources that provide event information rather than relying on server processes (216 and 218) to translate the input to canonical formats. Many such design choices will be apparent to those skilled in the art.

Batch Event History Executive Methods

Figure 3:
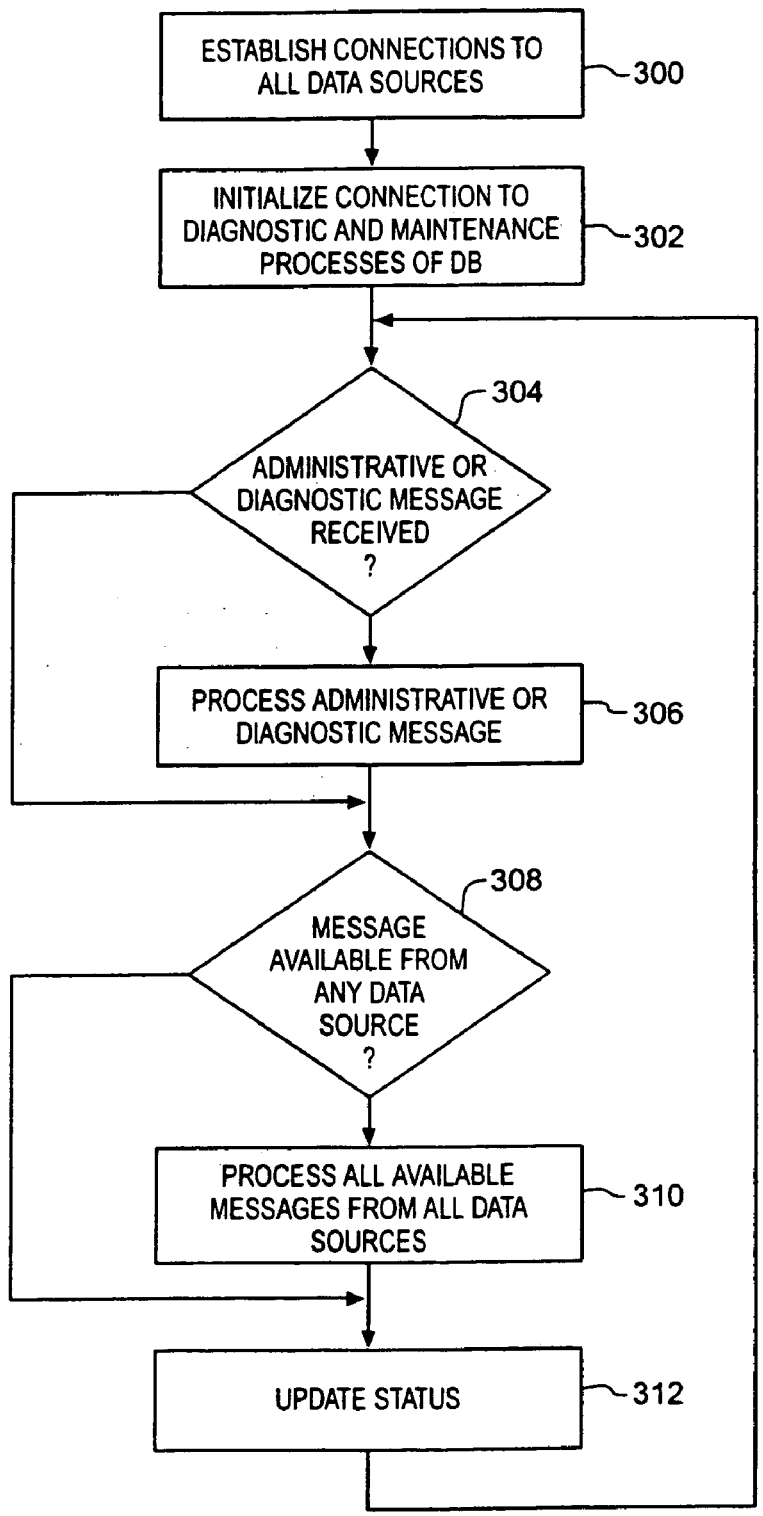
FIG. 3 is a flowchart describing the operation of the batch event historian of the present invention.

FIGS. 3 through 8 are flowcharts describing the operation of batch historian 200 and in particular batch history executive 202. FIG. 3 describes the high level operation of batch historian executive 202 of FIG. 2. FIGS. 4 through 8 provide additional details regarding particular aspects of the operation of the executive.

Element 300 of FIG. 3 is first operable to establish connections to all presently configured data sources—to "attach" to the data sources. As noted above, in the preferred embodiment, inter-process communications are used between the executive and a server process (not shown) associated with each data source. The presently configured data sources are a configuration parameter of the historian stored in the persistent object store. In the preferred embodiment there are two data sources, namely the process events and batch events (procedural events).

Further inter-process communication links are then established by element 302 to the diagnostic and administrative interface programs to permit the user to administer the operation of the batch historian. As noted above, the diagnostic and administrative interfaces permit a user to manage the operation of the batch historian by starting its operation or shutting down operation. Other configuration changes are permitted via these interfaces including, for example, changing the capacity or location of the persistent store, adding/removing/modifying data sources attached to the executive or performing archival management functions.

Elements 304 through 312 are then iteratively operable to process data received at the executive from any of the attached data sources (including the administrative and diagnostic interfaces). Element 304 is first operable to determine whether any messages are available from the administrative or diagnostic interfaces. As noted above, these interfaces (data sources) provide the executive with operator input to startup or shutdown operation as well as reconfiguration information such as size or location of the persistent object store or addition/removal/modification of a data source. If such messages are available, element 306 processes all such messages available from the administrative and diagnostic data sources. In both cases, processing then continues with element 308.

Element 308 is next operable to determine whether any messages are available from the other configured data sources. In the preferred embodiment, these data sources include at least a batch event data source and a process event data source. The batch event data source provides messages that describe events generated by the batch server process in execution of a batch procedure. As noted above, in the preferred embodiment, these messages are provided through a server process that converts the messages to a preferred canonical form. In like manner the process events are messages provided through a server process and reflect information generated by equipment and the operator during the processing of a batch.

If such event information is available from the presently configured data sources, element 310 is operable to process all such messages. Processing of the messages includes storing appropriate objects in the persistent store to record the occurrence of the various events and to generate relationships among the various gathered events. In particular, element 310 reconstructs the timeline and hierarchy of batch procedural events from the messages so processed. For example, where a new phase is started, the object stored is related to other objects that record information about the related operation, unit procedure and procedure. If such related objects are not present in the persistent store, element 310 creates all such related objects upon processing of the received phase started event. Additional details of processing of element 310 are provided below with reference to FIG. 6.

When all messages presently available from all data sources have been processed by elements 304 through 310, element 312 is next operable to update the status of the history executive. Updates made to the persistent store are preferably made in higher speed cached operations. Volatile cached versions of the various objects are manipulated as required for the messages processed by the executive. Element 312 periodically commits all such changes to these volatile cached objects to the persistent store of the batch event historian. Further, element 312 processes diagnostic or administrative interface requests to reconfigure the size or location of the persistent store. Additional details of the processing of element 312 are provided below with reference to FIG. 8.

Processing then continues by looping back to element 304 to process newly received messages.

Those skilled in the art will recognize a number of equivalent software techniques for implementing the above described method of processing in the batch history executive. For example, receipt of messages could cause awakening of an otherwise dormant executive process as distinct from the message polling technique described above. Or, for example, object manipulation could be performed directly in the persistent store rather than in volatile cached objects to thereby obviate the need to periodically commit prior changes. Such matters of design choice are well known to those skilled in the software arts.

Figure 4:
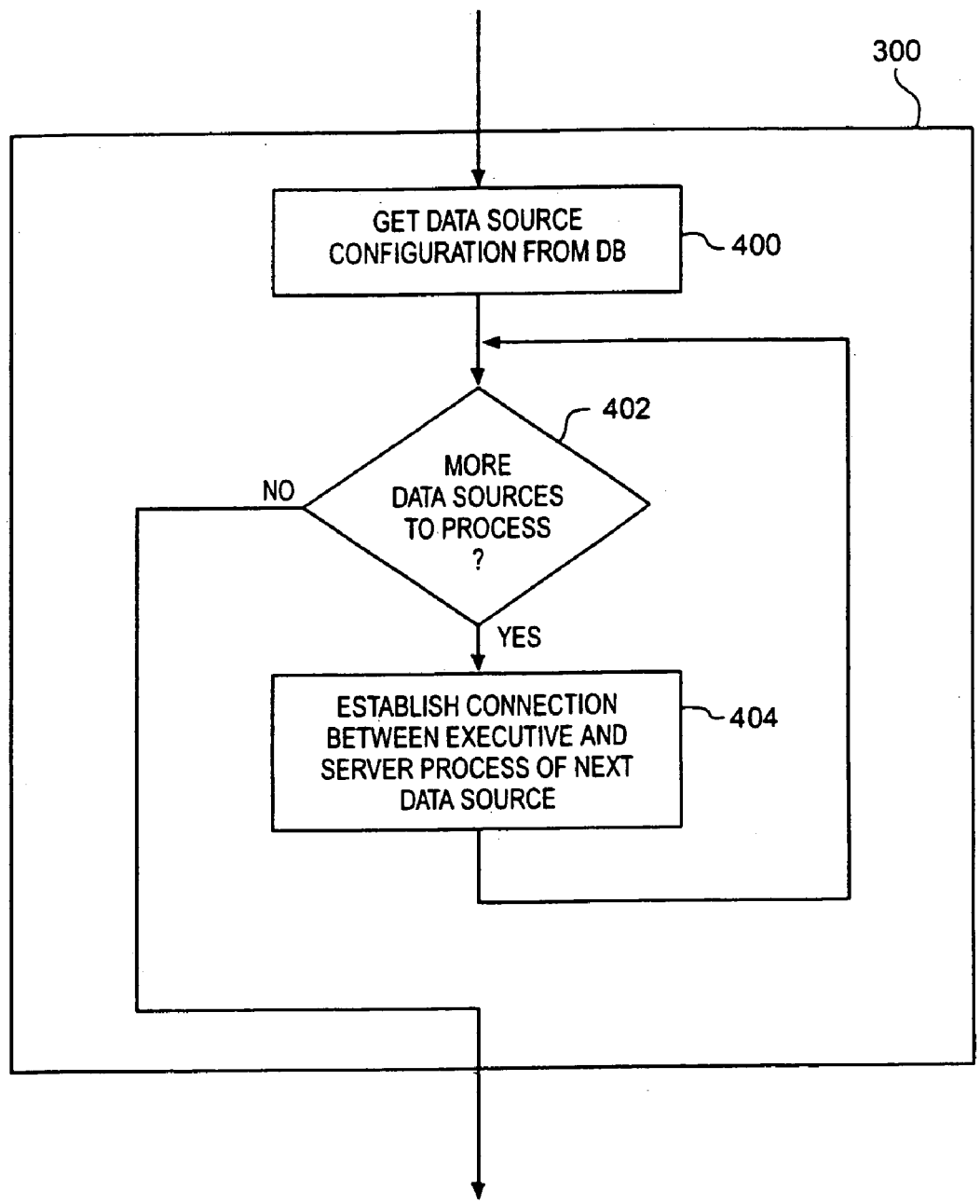
FIGS. 4–8 are flowcharts describing additional details of the batch event historian of FIG. 3.

FIG. 4 provides additional details regarding the operation of element 300 to establish connections to all desired data sources attached to the batch history executive. Element 400 is first operably to get information from the persistent store identifying the present configuration of data sources for the history executive. As noted above, the executive preferably stores this configuration information in the persistent store and updates it in accordance with user input from the diagnostic or administrative interfaces. A data source is preferably identified by an inter-process communication channel to be attached to the executive. Other meta-data is also included describing the structure and semantic of the messages received from the associated data source.

Elements 402 and 404 are then iteratively operable to establish the connection between the history executive and the associated server process for each data source found in the present configuration as reflected in the persistent store.

When element 402 determines that all presently configured data sources have been processed by element 404, processing of element 300 is complete.

Figure 5:
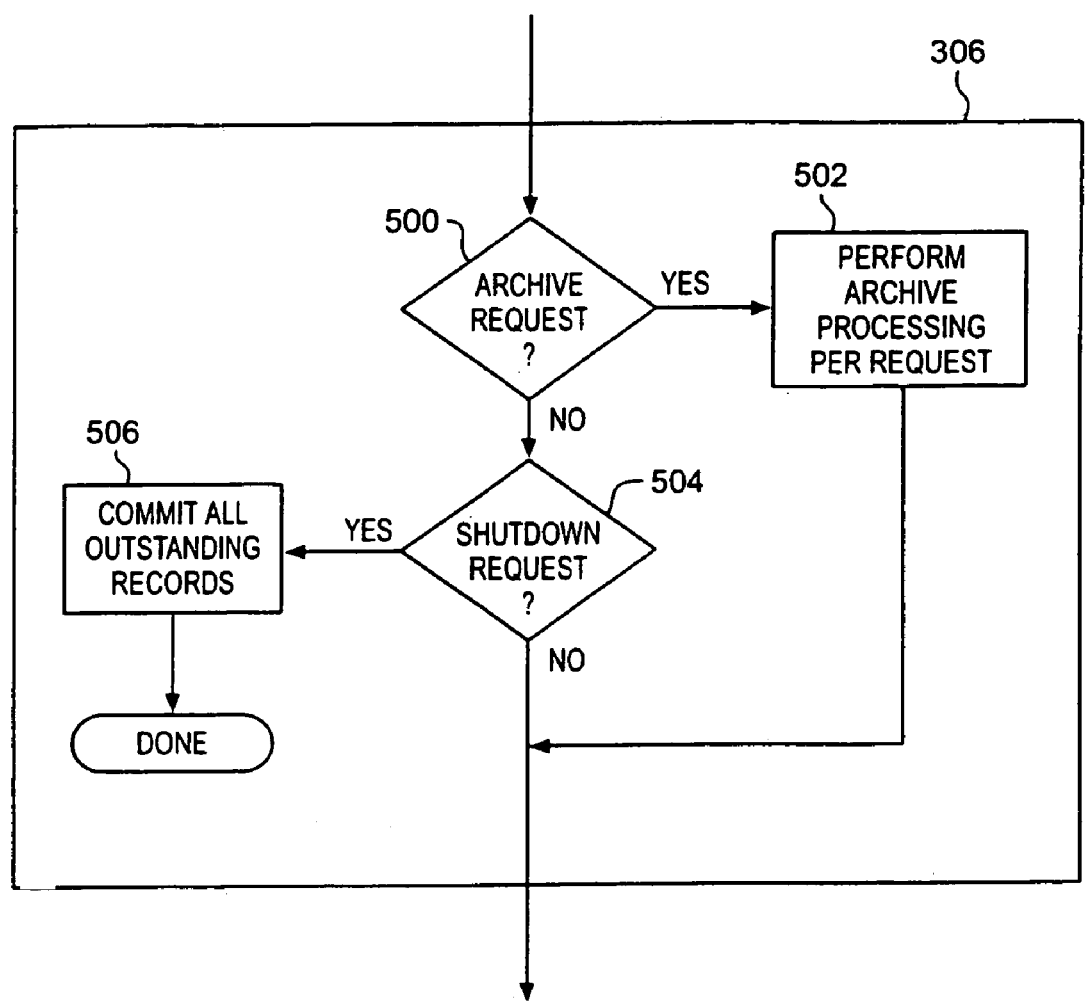

FIG. 5 is a flowchart describing additional detail of the operation of element 306 of FIG. 3 to process administrative and diagnostic messages from an operator. Element 500 is first operable to determine whether an archive request has been received. If so, element 502 is next operable to process the archive request to thereby complete processing of element 306. Otherwise, processing continues with element 504.

An archive request instructs the executive to archive and/or delete a portion of objects stored in the persistent store. For example, an operator may request the executive to delete all objects pertaining to a particular batch that was known to fail for unimportant reasons. Rather than leave such irrelevant objects stored in the persistent store, the operator may utilize the administrative or diagnostic interface to the executive to request deletion of the related objects. Or, for example, an archive request may ask the executive to retrieve objects and archive them in a new location and then remove the archived objects from the persistent store. Such a request may be used to clear out older objects relating to older processed batches. The objects so archived may then be moved to less costly "off-line" storage for archival purposes while freeing space for storage of objects for new batches.

This archive message API is also used to insert manually entered operator commentary as a stored event relating to a particular batch. For example, the operator may record certain environmental information not normally sensed or recorded by the batch process. Or, for example, an operator may simply log his personal start and stop times on a shift so that the operator responsible for a particular batch may be associated with the stored event information. Those skilled in the art will recognize a wide variety of such auxiliary information that may be recorded by an operator and stored in objects related to corresponding batch and process events.

When no archive request is present, element 504 is next operable to determine if a shutdown request has been received on the diagnostic or administrative interfaces. If so, element 506 is then operable to commit any presently uncommitted objects in the volatile cache storage to the persistent store. The processing of the executive itself it then complete. The executive is restarted by an operator through normal user interaction with the server node on which the history executive is operable.

Figure 6:
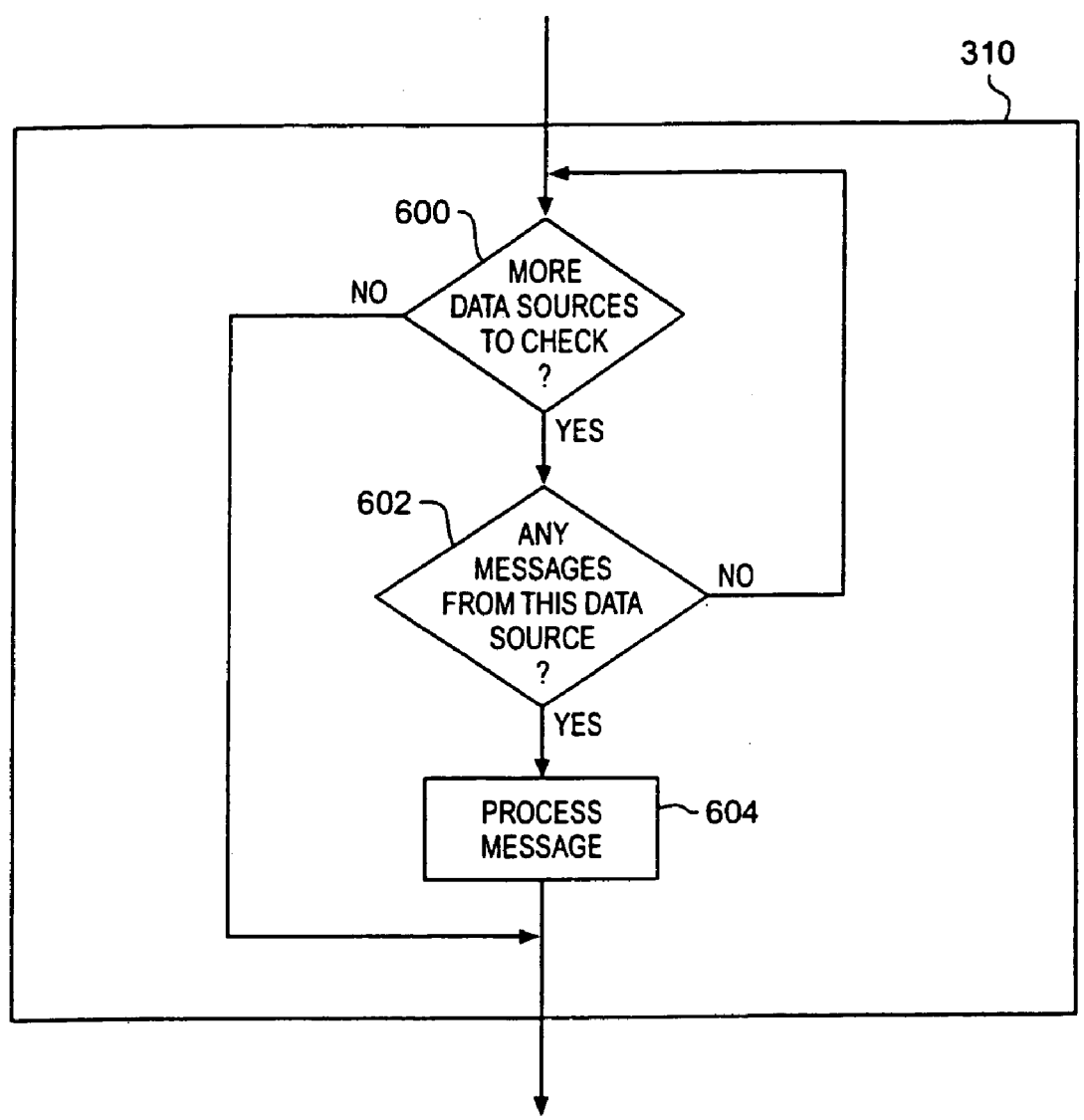

FIG. 6 is a flowchart describing additional details of the operation of element 310 of FIG. 3 to process an event information message from the other data sources presently configured in the executive operation. Element 600 is first operable to determine if all data sources presently configured have been processed by elements 602 and 604 as described below. If all data sources have been so processed, the processing of element 310 is complete. If a data source has yet to be processed, element 602 is next operable to determine if any messages are presently available from the next data source to be processed. If a message is available, element 604 processes the next message available from the data source. Following processing of the next available message from a data source, control returns to the calling function to permit processing of a next diagnostic or administrative message. In this manner all sources of data are processed with relatively equal priority rather than permitting a large volume of messages from a single data source to monopolize the processing of the historian for extended periods of time.

Figure 7:
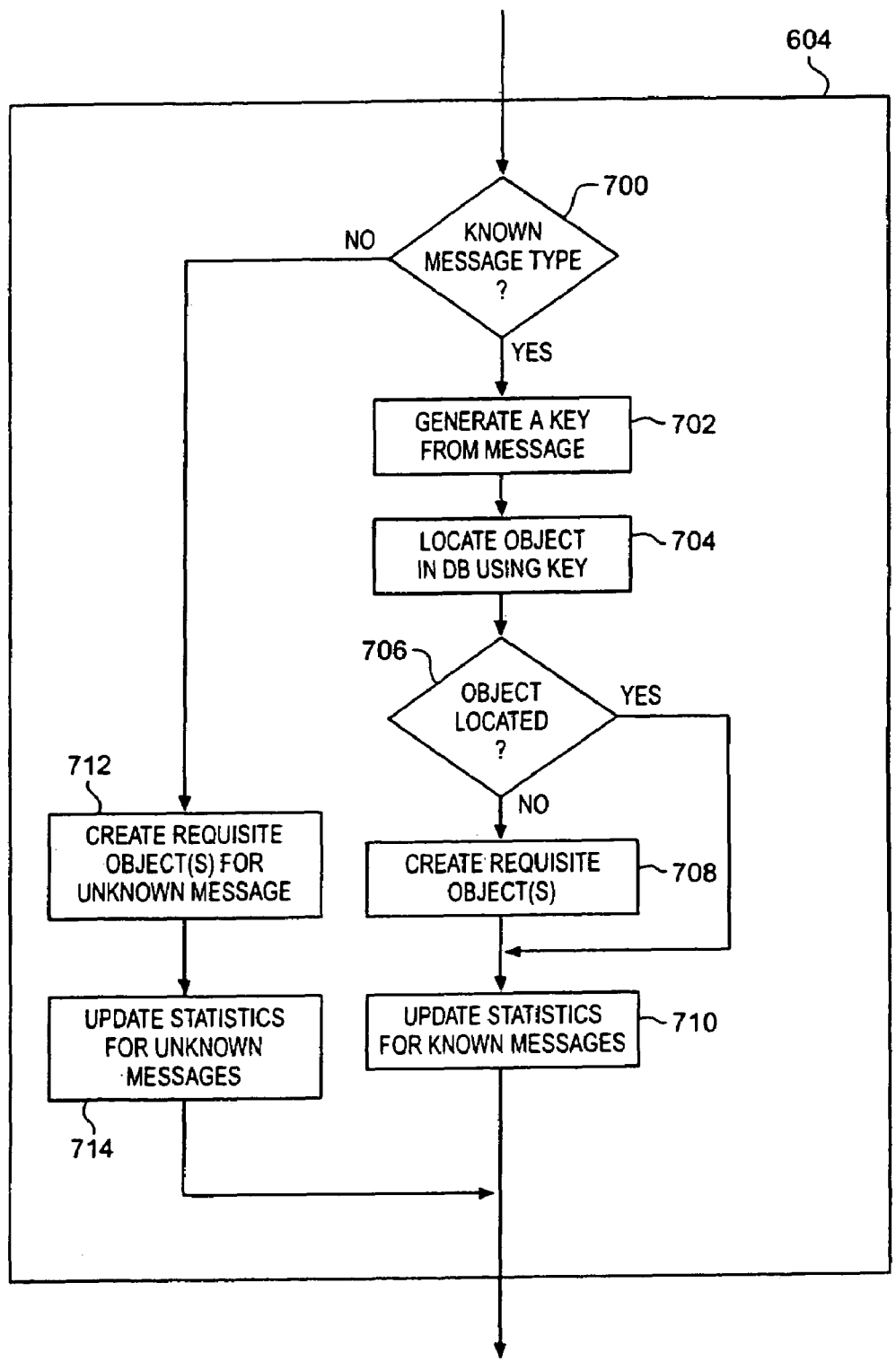

FIG. 7 is a flowchart describing additional detail of the processing of element 604 of FIG. 6 to process one message from one data source. Element 700 first verifies that the message is of a known type. As noted above in the preferred embodiment, all messages are converted to a canonical format by a server process associated with each data source. An aspect of that canonical format is preferably a message type identifier that identifies the message as associated with a particular data source and its corresponding server process. Element 700 therefore determines if the message type is a type known to the executive. Unknown message type cause processing to continue with element 712 to create an object corresponding to the unknown message. Even unknown messages are retained in the persistent store so that later post-processing may evaluate such messages and help determine their cause or relationship to other events of the batch process. The unknown message is parsed as best as can be done and related to any other possible objects (events, equipment, etc.) in the persistent store with which the unknown message may be related. Element 714 is then operable to account for receipt of an unknown message type in statistic stored by the executive thereby completing processing of element 604. Recognized message type cause processing to continue with element 702.

Element 702 generates a key from the event information contained in the message. Processing of a message entails generating a key from the message that describes the hierarchy of batch events that relate to the event information contained in the message. The key includes, for example, a batch identification, a procedure identification, a unit procedure identification, an operation identification, and a phase identification. Element 704 is then operable to locate an object in the persistent store (or presently cached objects in volatile storage) matching the generated key value. Element 706 determines whether element 704 successfully located the desired object in the persistent object store. If such an object is found (i.e., already recorded in the persistent or volatile object store) processing continues with element 710 to update the statistics relating to known objects manipulated by the executive. If no object is located matching the generated key, processing continues with element 708.

Element 708 is operable to create all objects necessary not yet known in the persistent object store based upon the generated key. For example, if the batch is at present unknown to the executive, an object for the batch itself will be created as well as objects for all the procedural events derived from the event information in the message. Specifically, any procedure, unit procedure, operation or phase derived from the event information in the message would also be unknown since the batch itself was previously unknown to the executive. Objects corresponding to each of these batch events derived from the event information of the message are also created in the persistent object store. As noted above, the created objects include timestamp information and identifying information for the event. Relationships among the objects are created in the object store as well.

Separate event messages indicating the activation, start, end and deactivation times are received for each procedural element. Whenever one of these event messages is received, the object describing the appropriate procedural element is found or created in the persistent store and the time is added to the appropriate field in the object. Event messages for equipment usage (i.e., use of physical elements in the batch processing) identify acquired and release times for the equipment. Similar processing is used to locate or create the usage description objects in the persistent store for the appropriate equipment and to add the acquire and release time information to appropriate fields of the object. All other event types such as operator changes to the batch process have only the time of occurrence of the event rather than more detailed start, stop, etc. times.

Processing then completes with element 710 updating the stored statistical information as noted above.

As discussed above, a key is generated to location an object corresponding to the received event message. In the preferred embodiment, there are a variety of such keys generated for different purposes. One key is used to identify the type of event message received. This message type key is actually used to select appropriate internal processing of the remainder of the message by the batch historian executive. Another key identifies a specific instance of a stored event and is used to determine if the message has already been received and processed. Use of this key eliminates storage of duplicate descriptions of the same event. Still another key value identifies a specific instance of an object such as a batch description, a recipe description, a formula description, a procedure element, an equipment identification, an equipment usage description or a user identification. This key is the principle key used to locate an existing object in the persistent storage when a message may cause additional information to be associated with an existing object.

Figure 8:
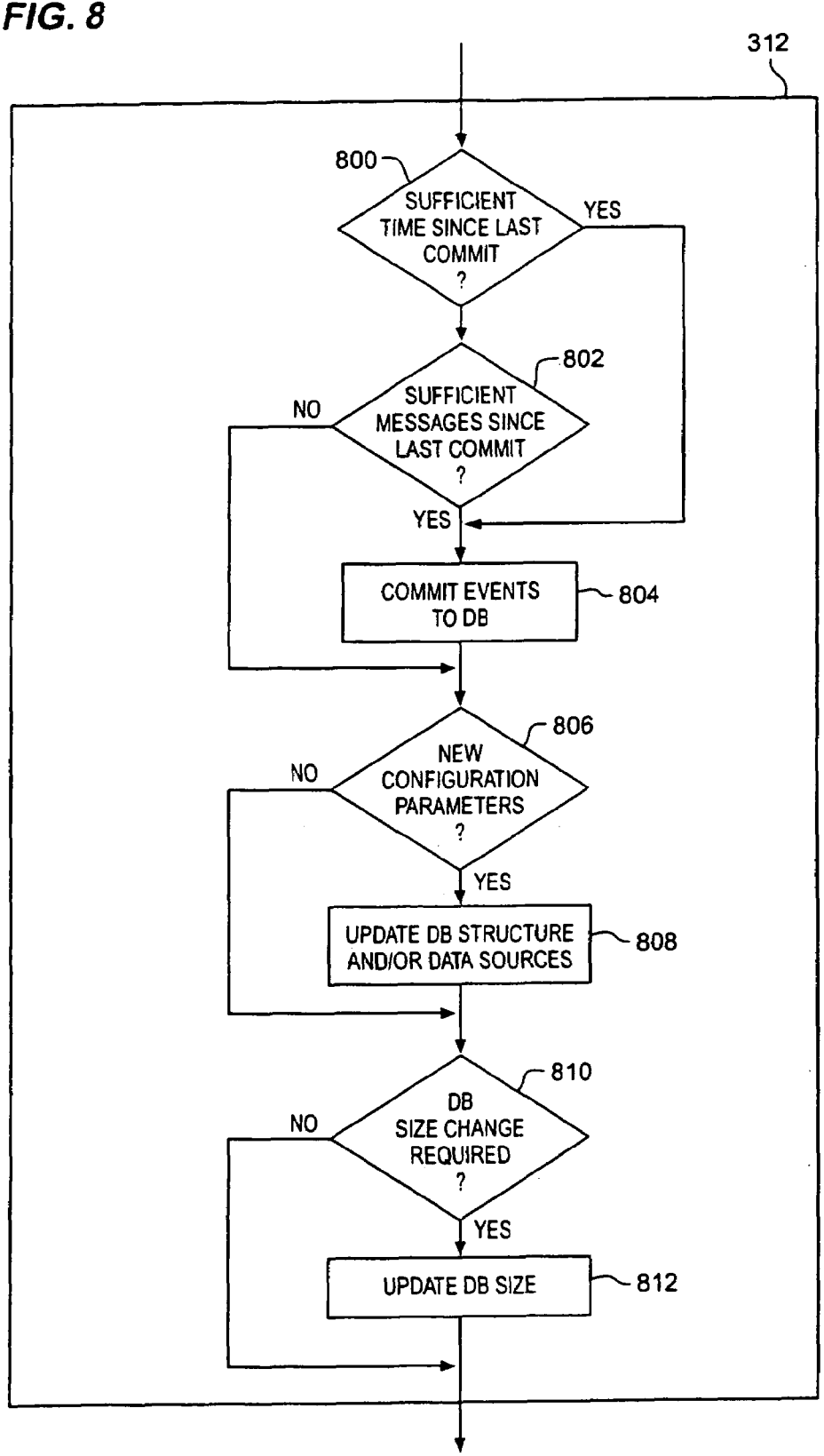

FIG. 8 is a flowchart describing additional details of the processing of element 312 of FIG. 3 to update the object store following processing of messages from data sources. Objects are preferably updated in volatile high speed cache memory as messages are processed. Periodically the updated objects in volatile high speed cache memory need to be committed to the persistent store for permanent retention. In the preferred embodiment, objects in the high speed cache volatile store are posted when either enough time has passed since the last such commitment or when enough message have been received and processed since the last commitment. Elements 800 and 802 are therefore operable to determine if either sufficient time has passed or if sufficient messages have been processed by the executive. If either condition is true, processing continues with element 804 to commit changed or new objects in the volatile object store to the persistent store. Processing then continues with element 806.

Elements 806 and 808 are operable to update the configuration of the object store in response to configuration changes supplied by an operator request. Exemplary of such a request is a request to add/remove/modify a data source for messages to be processed by the executive program. If element 806 determines that such a configuration change has been requested, element 808 effectuates the requested changes in object store configuration and executive operations. In both case processing continues with element 810.

Elements 810 and 812 are operable to change the size of the persistent object store in accordance with an operator request. If element 810 determines that such a request has been made, element 812 is operable to effectuate the necessary change in object store size.

As used herein, object store or persistent store refers to all storage of objects whether temporarily cached in a volatile cache memory of persistently stored (committed) to the object store. Such caching techniques to improve performance are matters of design choice well known to those skilled in the art.

Batch Event History View Client

As noted above with respect to FIG. 2, the present invention includes a view client process that permits the user significant flexibility in viewing the event information and the relationships among the various events as derived by the batch history executive. The view client displays the event information in a graphical, user friendly manner using Gantt chart displays to represent batches and related procedural hierarchical events. The graphical user interface allows a user to select an event so displayed to "drill down" and view lower levels of the hierarchical events that make up the selected event. A textual, tabular format presentation of hierarchically lower events that comprise the selected event are also displayed in a textual tabular format below the graphical Gantt chart presentation. The view client of the present invention also enables the user to graphically view continuous data for logged data points in a manner that relates the continuous data to associated event information. In other words, the continuous data is viewed by selecting a batch event from the user's display and requesting that continuous data for that selected event be displayed for one or more selected data points.

Figure 10:
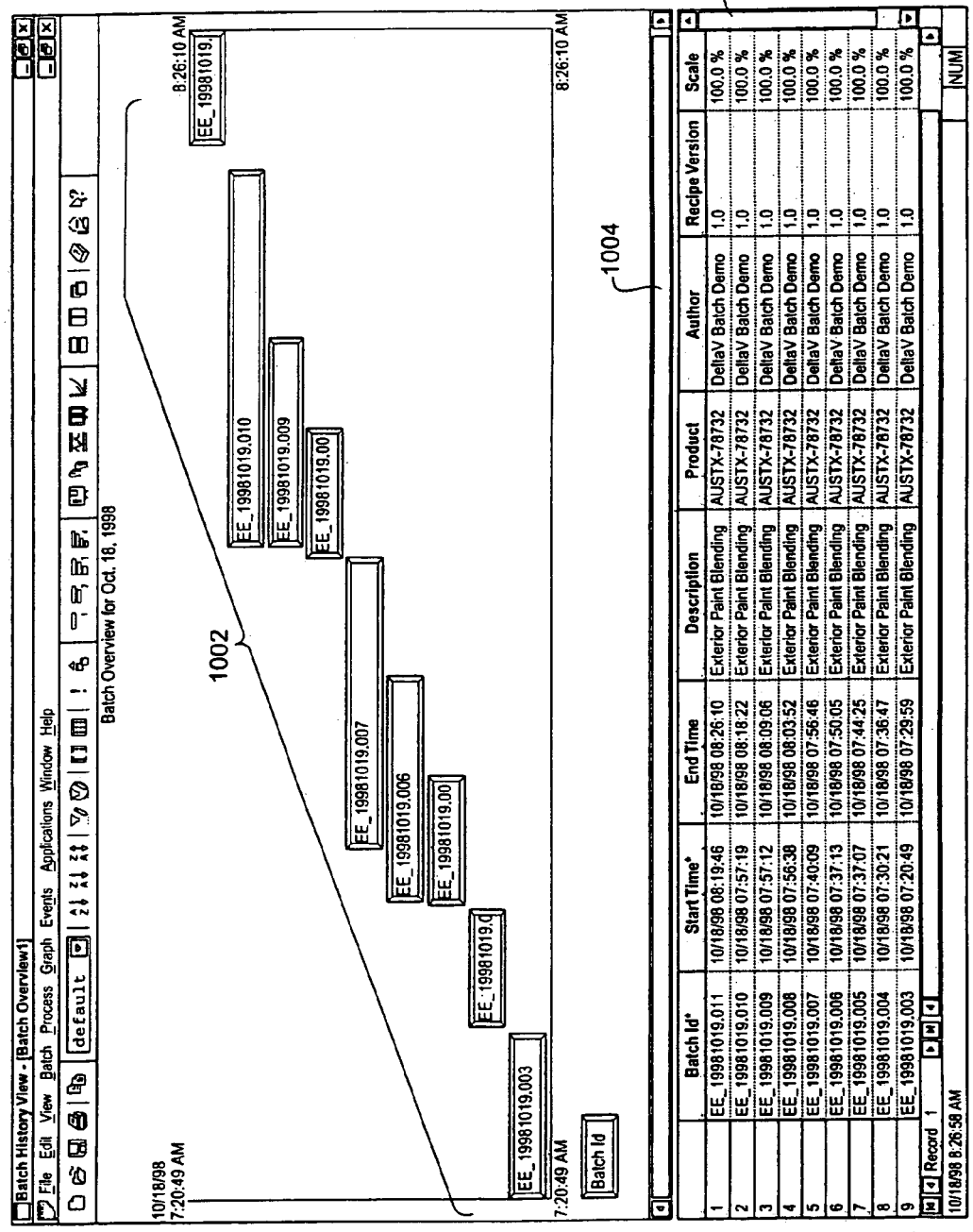

FIGS. 10 through 21 are exemplary display screen images that help describe the operation of the batch event history view client. FIG. 10 is an exemplary display screen showing a batch overview. Each batch 1002 having event information recorded in the object store is shown in Gantt chart style on a window of the user's display. For each batch so displayed in Gantt chart form, a corresponding tabular textual entry is shown in event detail table 1000. A horizontal scroll bar 1004 associated with the Gantt chart display allows the user to scroll horizontally in the Gantt chart display to view batches having earlier or later times associated therewith. Vertical scroll bar 1006 associated with event detail table enables the user to scroll through other batches not presently displayed in Gantt chart form. All batches for which entries are displayed in event detail table 1000 are shown in Gantt chart form 1002 above the table.

As shown in FIG. 10, each batch is labeled with its corresponding batch ID both on the Gantt chart of the batch and in the corresponding textual entry in event detail table 1000.

Figure 11:
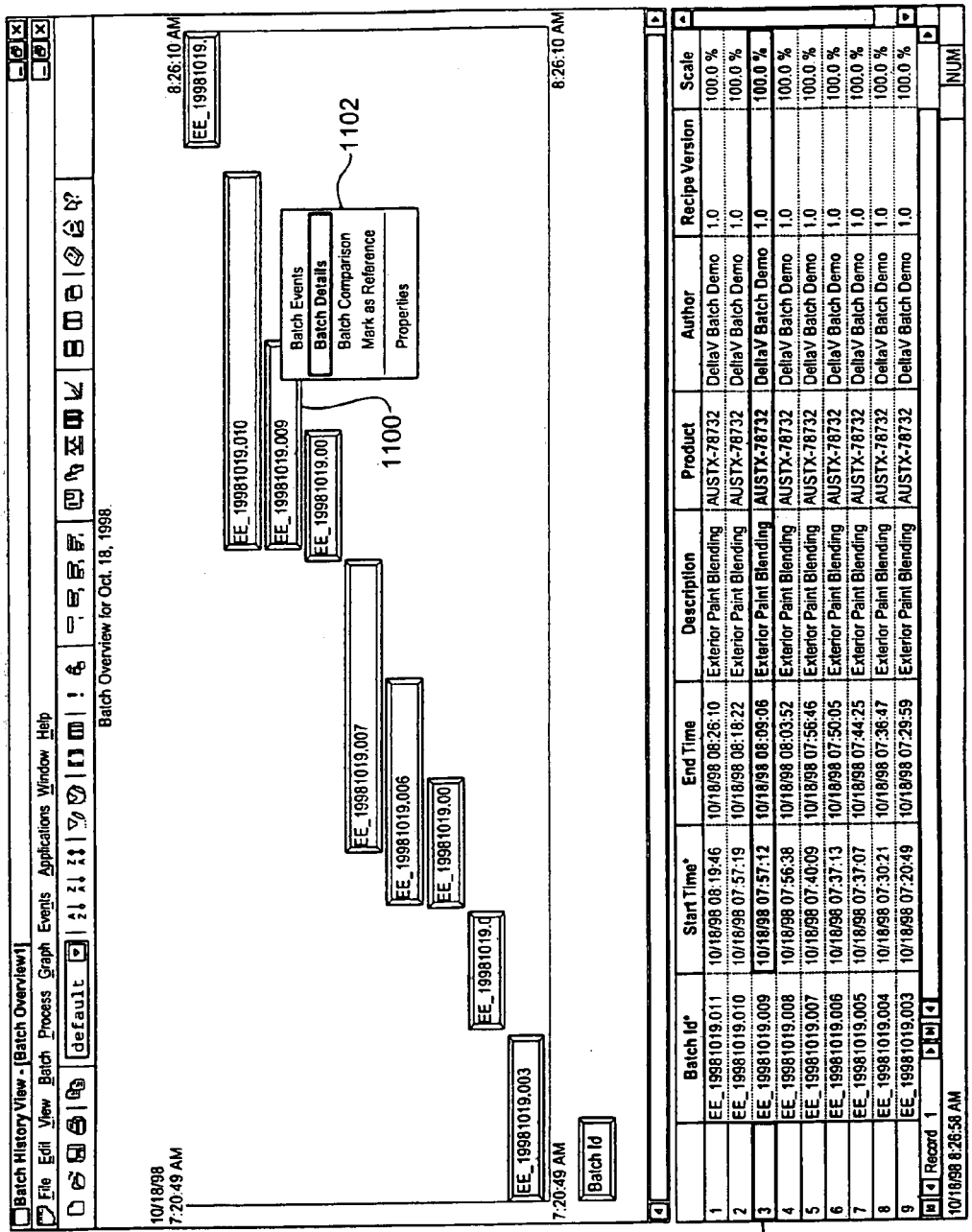

As shown in FIG. 11, a user may select one of the displayed batches to inspect further details of the processing of that batch. A user selects a particular batch by "clicking" the desired batch. In FIG. 11, batch 1100 (labeled EE_19981019.009) has been selected by a user. The selected batch is highlighted on the display screen and the corresponding table entry 1104 is also highlighted. Pop-up menu 1102 is activated typically by "right clicking" on the selected batch. The pop-up menu enables the user to request the display of additional details regarding processing of the selected batch.

Figure 12:
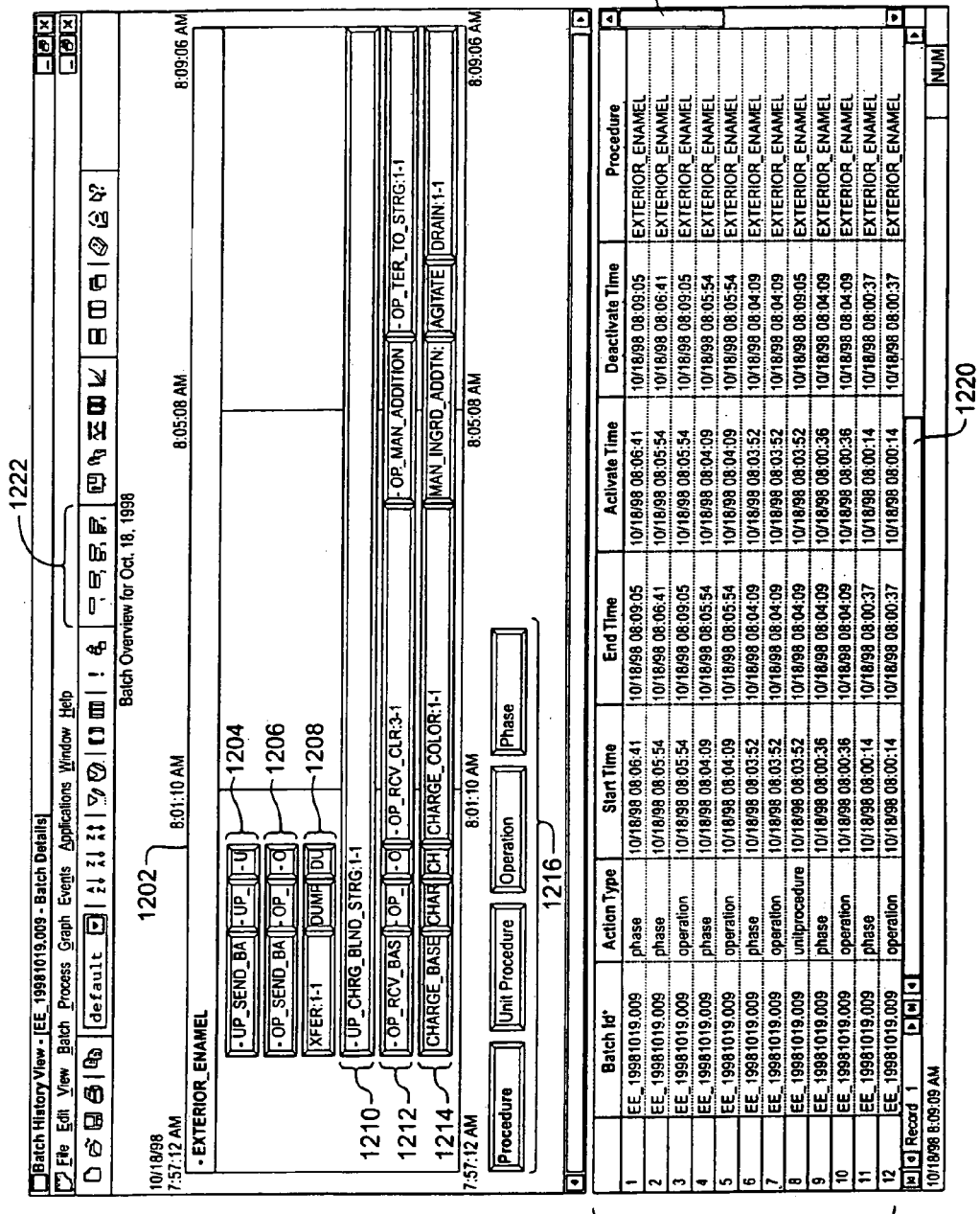

FIG. 12 is an exemplary display of the details of processing of batch 1100 (labeled EE_19981019.009). The user may return to the batch overview screen (of FIG. 11) by closing this display screen. The procedure 1202 that made the batch (a procedure named EXTERIOR_ENAMEL) is shown in Gantt chart form scaled initially to the entire width of the Gantt chart display area of the user's screen. In particular, this exemplary procedure was started at 7:57:12 AM on Oct. 19, 1998 and ended at 8:09:06 AM the same day. The unit procedure 1204 and 1210 that comprise this procedure are shown below the procedure in Gantt chart form. The operations 1206 and 1212 that make up each unit procedure are shown below the corresponding unit procedure also in Gantt chart form. Lastly, the phases 1208 and 1214 that make up each operation are shown below the corresponding operation also in Gantt chart form.

In the preferred embodiment, procedure, unit procedure, operation and phase Gantt charts are easily distinguished by color coding. A color code legend 1216 is therefore provided to clarify the color coding of the Gantt charts.

Event detail table 1222 shows events that comprise the execution of the procedure that made the selected batch. Vertical scroll bar 1218 permits scrolling through additional event information not presently shown in the table 1222. In like manner, horizontal scroll bar 1220 associated with table 1222 permits the user to scroll through additional detail of the present displayed events in the table 1222.

Scroll bars (not shown) may also be associated with the Gantt chart portion of the display. In general, the event information shown in the event detail table 1222 will correspond to the procedural element graphically selected in the Gantt chart portion of the display. Those skilled in the art will recognize that a strict correspondence is neither necessary nor practical. The level of detail presented in each section may vary in accordance with the actual events associated with a particular selected procedural element and with other hierarchically related elements and events. In the preferred embodiment, the event detail table 1222 and Gantt chart display portions are coordinated to show some correlated information but scroll bars in both sections of the display permit the user to view any desired portion of the data.

Detail selection tools 1200 in the toolbar at the top of the display allow the user to select a preferred level of detail to be displayed regarding the selected batch. Levels 1 through 4 may be selected in the preferred embodiment. At level 1, only the procedure(s) that comprise the batch are displayed. At level 2, the procedure(s) are displayed and the corresponding unit procedures are displayed under the procedures. At level 3, the procedures, unit procedures and corresponding operations are displayed. Lastly, at level 4, the procedures, unit procedures, operations and corresponding phases are displayed.

Figure 13:
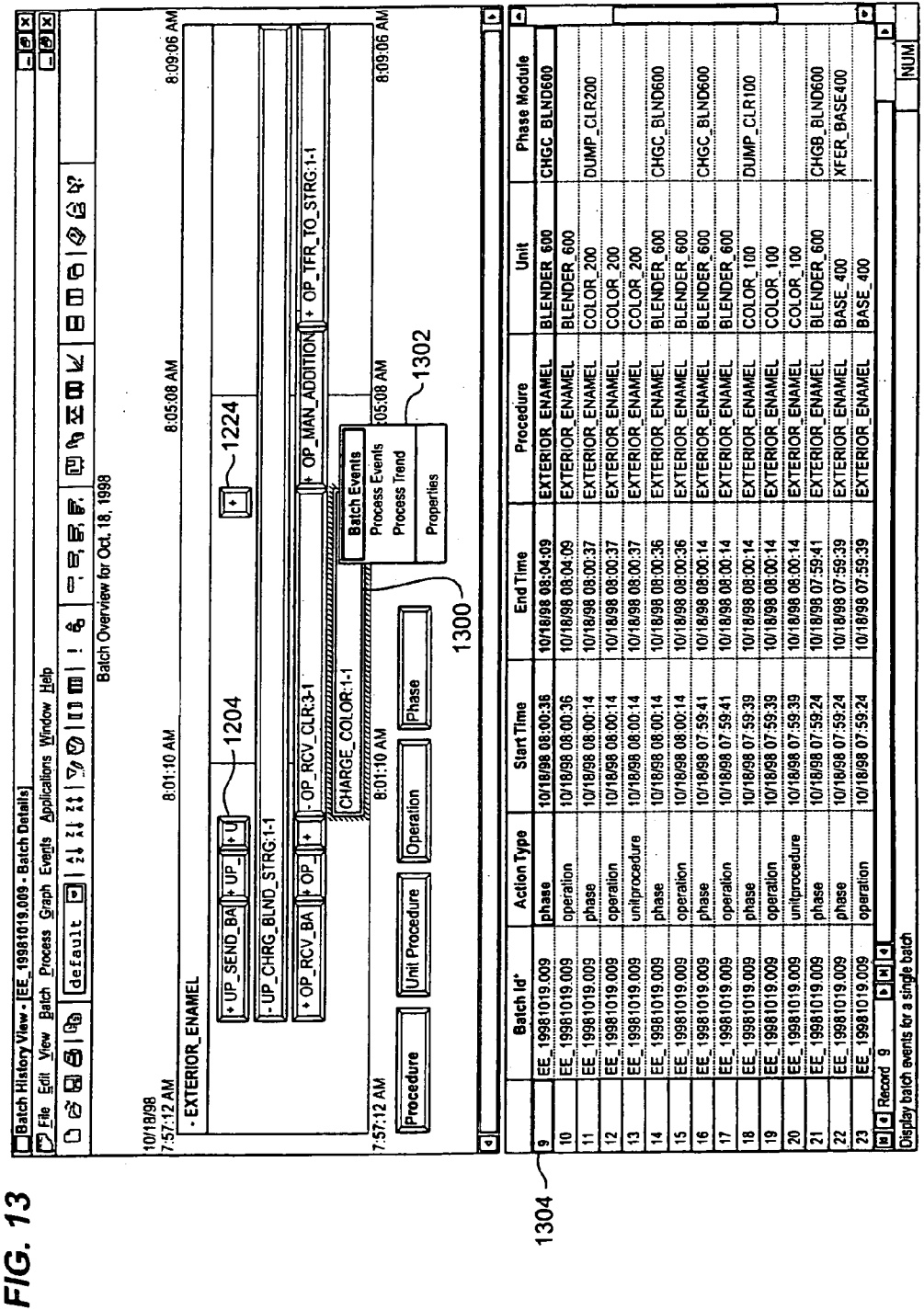

FIG. 13 shows that a user may select a particular event to view additional detail related thereto. As shown in FIG. 13, a phase 1300 named CHARGE_COLOR:1.1 has been selected. The Gantt chart bar for phase 1300 and the corresponding table entry 1304 are therefore highlighted. Pop-up menu 1302 then enables the user to request more information about the events specifically related to the selected event (i.e., events within phase 1300). FIG. 14 is exemplary of the resulting table 1400 from the detail information request of FIG. 13. The user may return to the previous screen (of FIG. 13) by closing this display screen.

Figure 15:
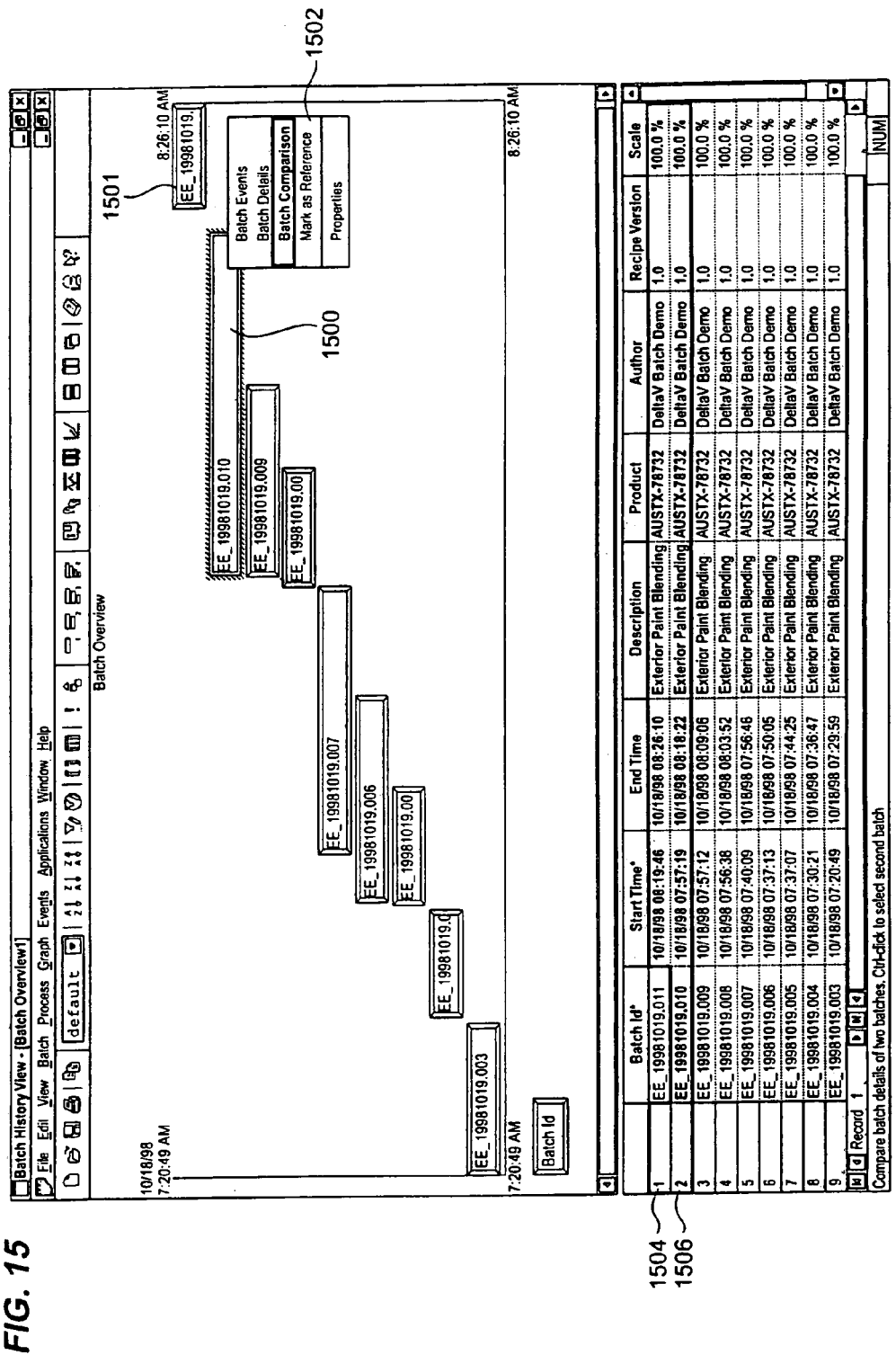

FIG. 15 is a batch overview display screen as above in FIG. 10 wherein a user has selected two batches 1500 and 1501 for comparison purposes. The selected batches 1500 and 1501 and the corresponding textual event entries 1506 and 1504, respectively are therefore highlighted on the display. Pop-up menu 1502 then permits the user to compare the two selected batches on the display screen. Those skilled in the art will recognize that any number of such selected batches may be compared.

Figure 16:
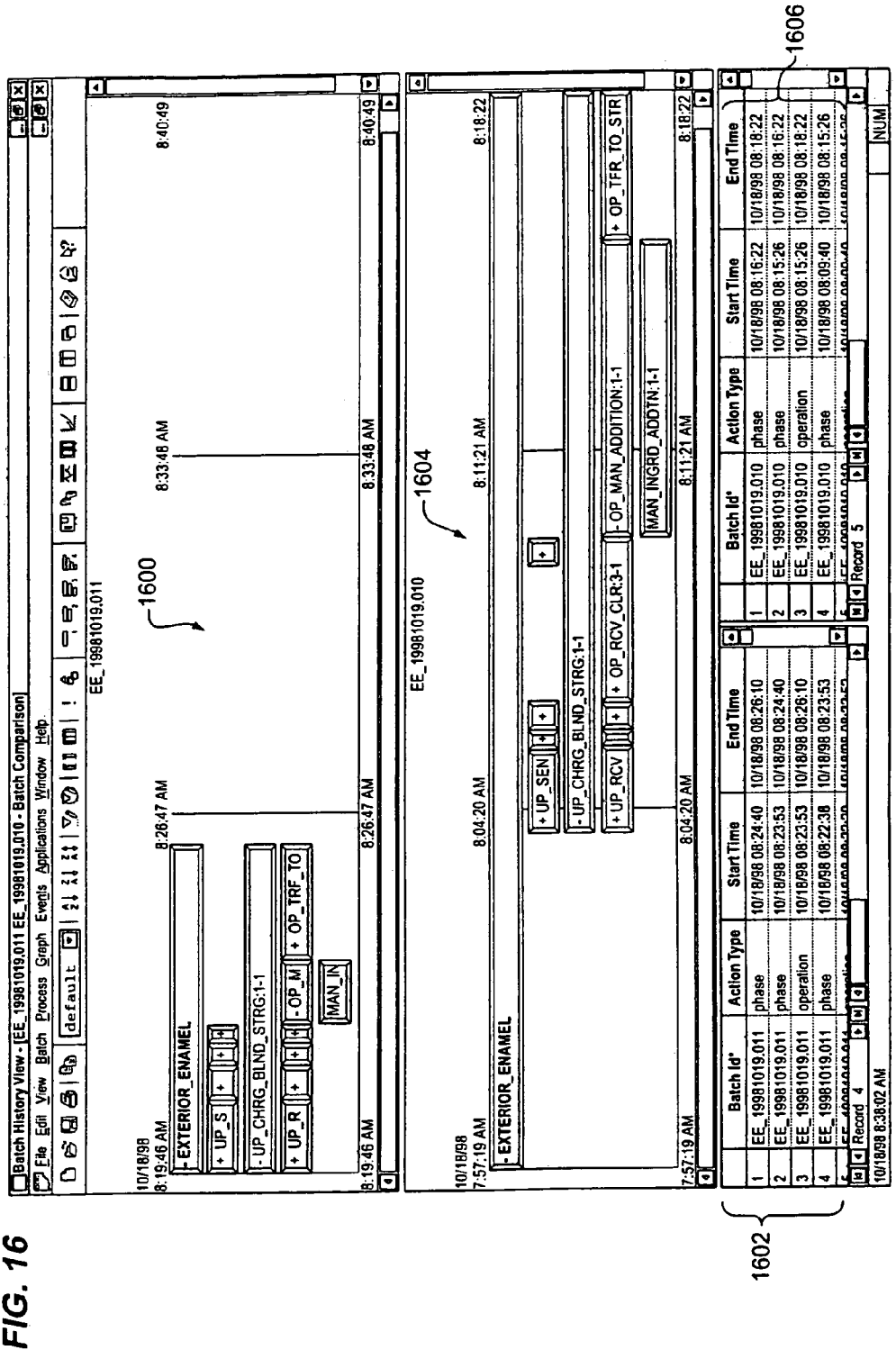

FIG. 16 then shows the resultant batch comparison screen. A batch 1600 labeled EE_19981019.011 is shown in Gantt chart form as discussed above and in a corresponding textual table 1602. The second 1604 selected batch labeled EE_19981019.010 is also shown in Gantt chart form and a corresponding textual table 1606. Initially both batches are displayed at the same time scale with their actual start time at the corresponding left edge of their respective Gantt charts.

The batch comparison screen of FIG. 16 allows a user to quickly view differences in the processing of two batches. For example, if one of the two batches is a perfect or "golden" batch that produced known quality product, then the cause(s) of quality problems in a second batch may be more easily identified by the differences in the Gantt charts of the execution of the corresponding two procedures.

To aid in visually detecting such differences, it is often useful to view the batch processing in batch relative time (time from the start of the batch processing) as distinct from absolute time. In addition, it may be useful to permit the user to graphically align the two Gantt chart displays a particular selected starting point in the process rather than always at the start of the procedure. Such alignments permit the user to disregard certain known, explainable discrepancies such as delays waiting for a particular equipment module to become available or for operator input in the batch process.

Figure 17:
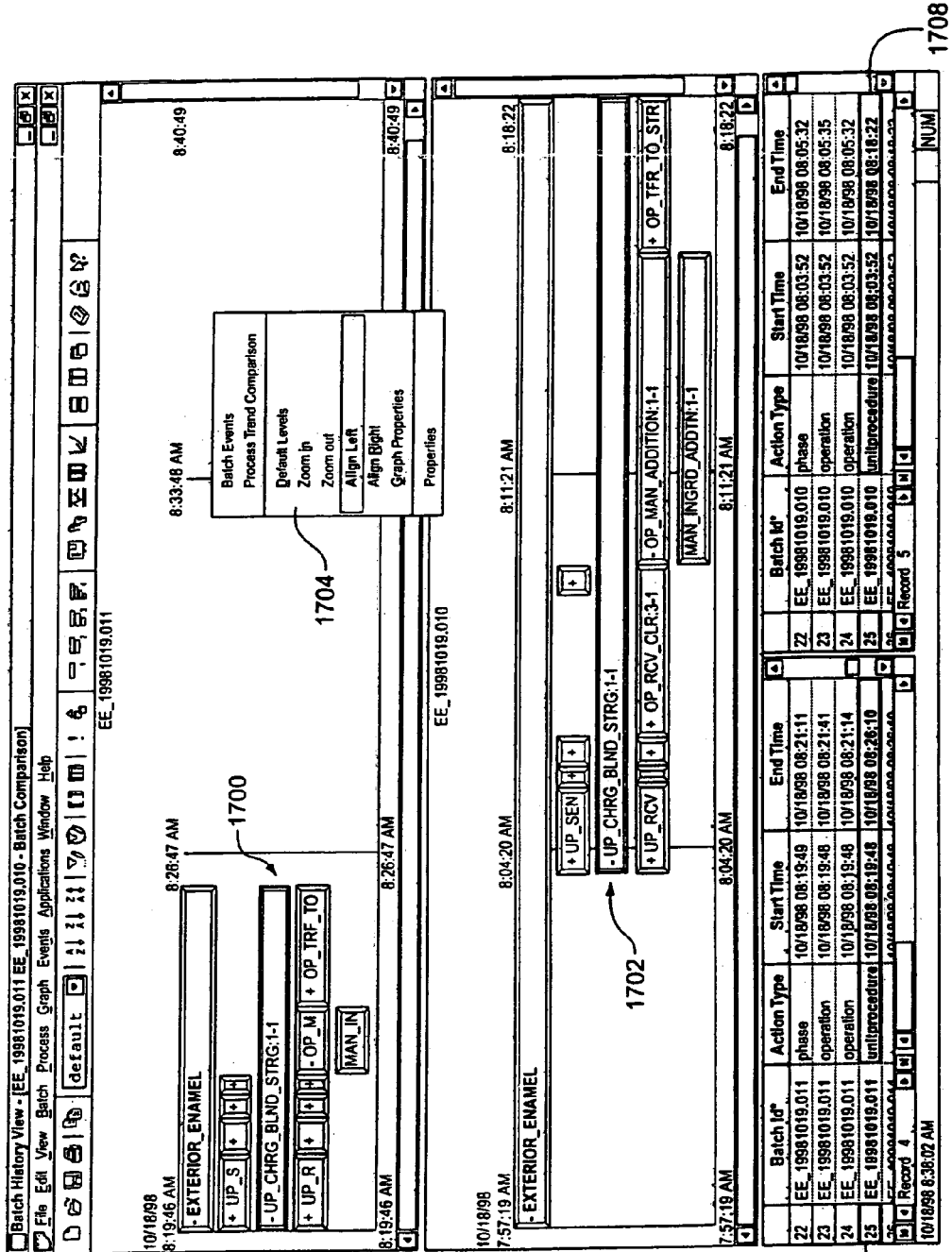

In FIG. 17, the user has selected two events 1700 and 1702 (namely the same unit procedure from both procedures). The selected unit procedures 1700 and 1702 and the corresponding textual table entries 1706 and 1708, respectively, are therefore highlighted in the display. Pop-up menu 1704 then permits the user to select an align left or align right option. The align left option shifts the resulting display so that the two selected events are aligned at their start times. Align right aligns the selected events at their respective end times. In both cases, the display can be toggled to batch-relative time scales rather than real time scales.

Figure 18:
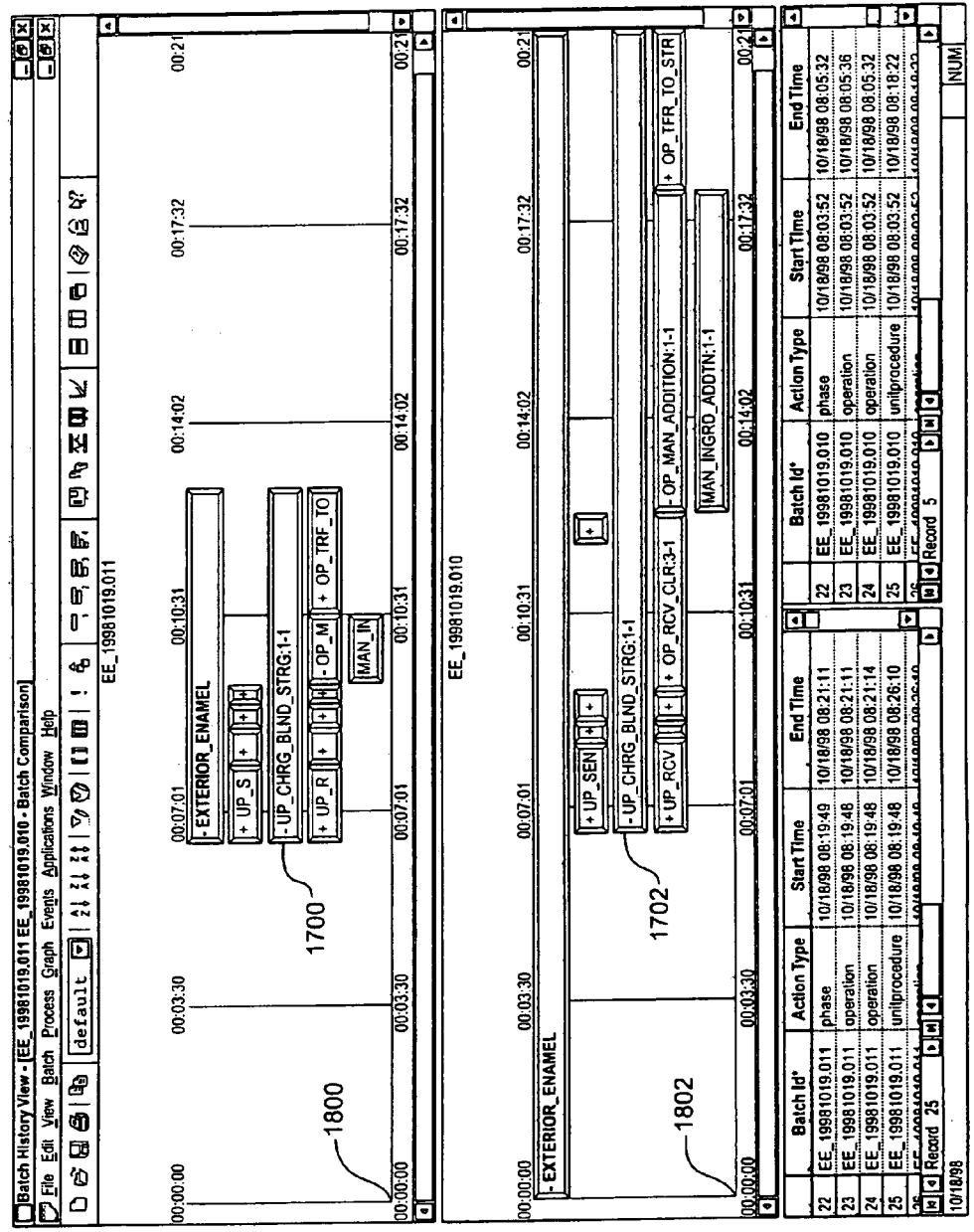

FIG. 18 is the display that results from the align left request of FIG. 17. The selected unit procedures 1700 and 1702 are displayed such that their respective start times align in the Gantt chart displays. The time base was also selected as batch-relative (time since the start of the batch as distinct from absolute time). Reference 1800 and 1802 point to the zero time start of the time axis in batch relative time. This aligned view helps to emphasize the differences in the processing of one batch as compared to another batch. Events that took an inordinate amount of time or an extraordinary short period of time are visually distinct in the display.

Though particularly useful for visual comparison of two or more batches, presentation of Gantt charts in batch relative time may have other useful applications. The ability to change the timeline basis from absolute time to batch relative time and the related feature of aligning Gantt chart displays at any desired boundary are therefore, preferably, independent of the comparison features of the present invention.

Continuous data logged from the various data points in the batch process may also be viewed from the view client. A user selects a desired event and then requests continuous data be displayed for that period of time. The particular continuous data points available during the selected event are presented to the user in a dialog box such that the user may select one or more data points to be presented. In the preferred embodiment, the requested continuous data point values are plotted as a linear graph.

Figure 19:
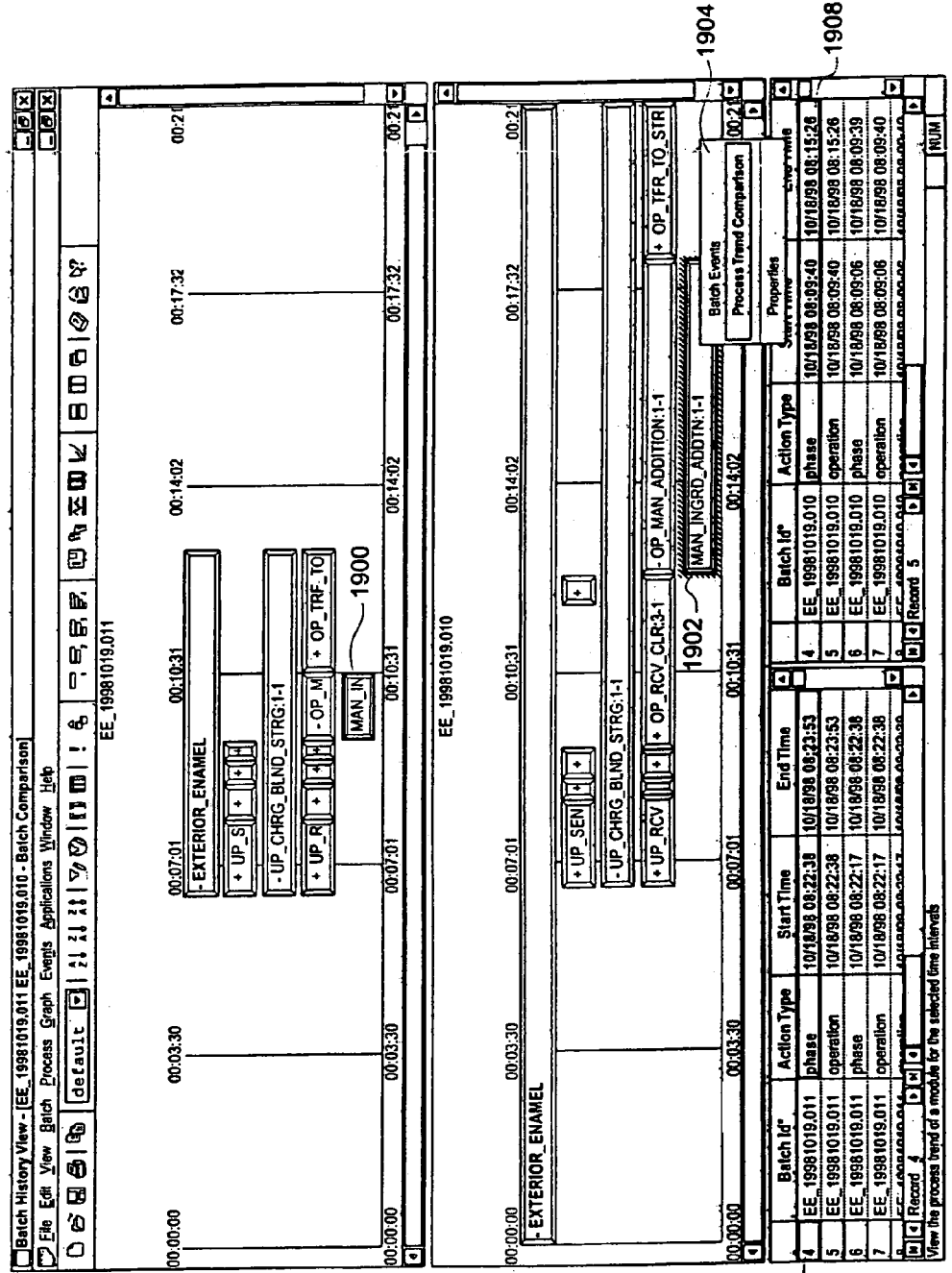

Continuous data may also be plotted as a comparison of continuous data from a batch comparison display as in FIG. 18. FIG. 19 shows the left aligned batch comparison of different batches as in FIG. 18 wherein two events are selected, phases 1900 and 1902. The selected phases 1900 and 1902 and the corresponding textual entries 1906 and 1908, respectively are highlighted on the display. Pop-up menu 1904 then permits the user to request a trend comparison of continuous data.

Figure 20:
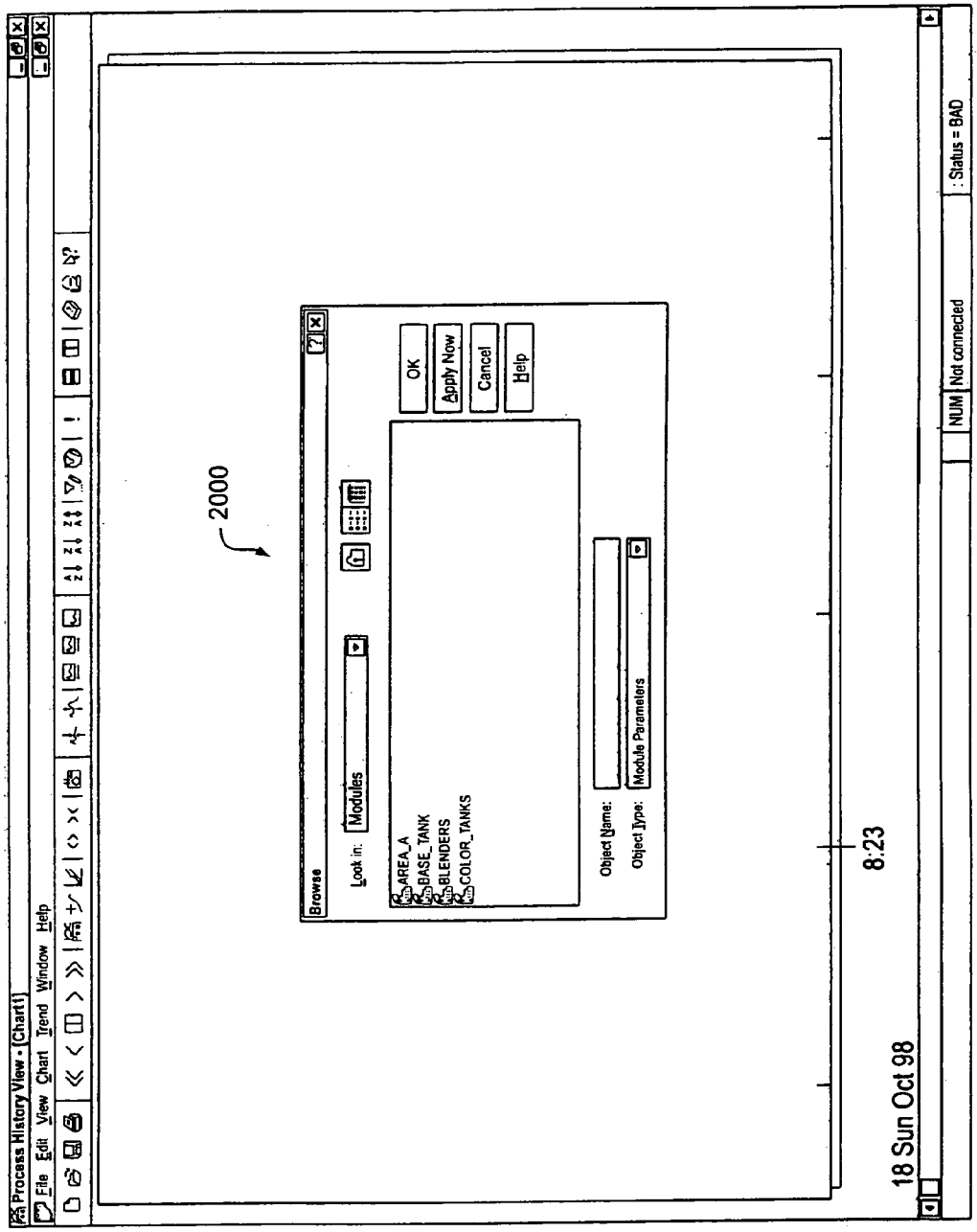

A dialog box as shown in FIG. 20 is then displayed to permit the user to select desired continuous data points for the trend comparison.

Figure 21:
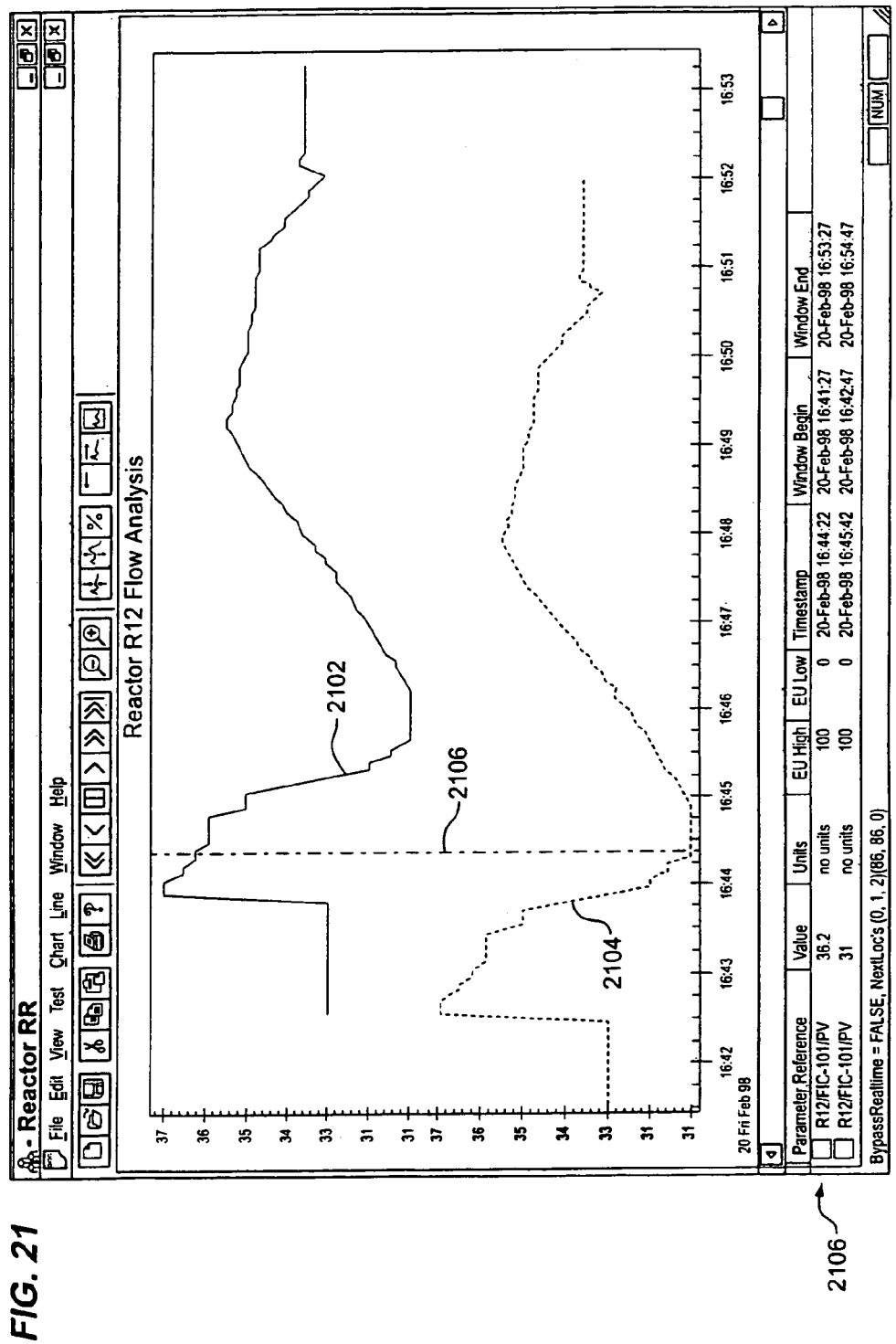

FIG. 21 then shows the resultant linear graph produced to compare the selected continuous data points over the selected event duration.

Batch Event History View Client Methods

Figure 9:
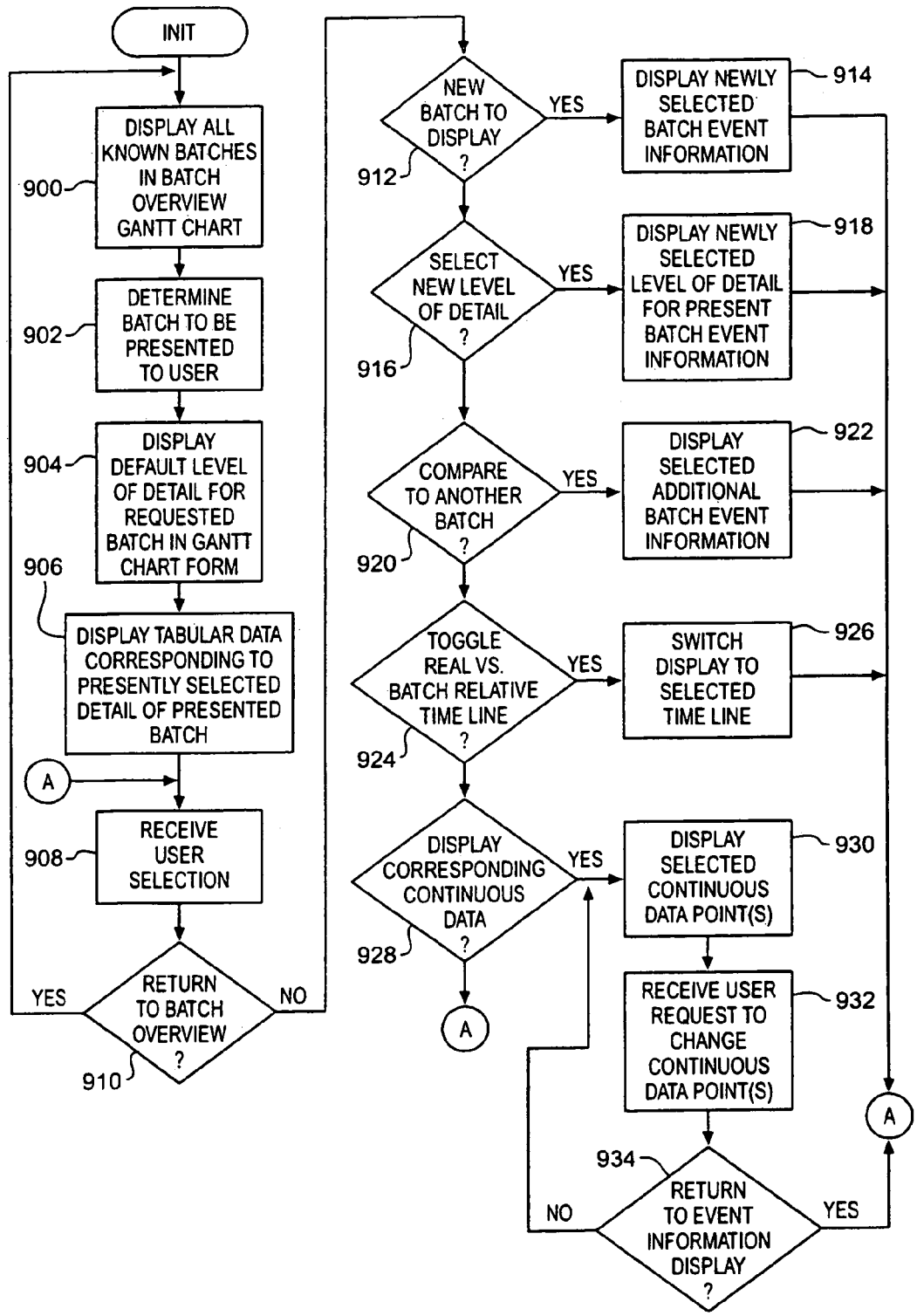
FIG. 9 is a flowchart describing the operation of a batch event history view client of the FIG. 2.

FIG. 9 is a flowchart describing the method of the view client to process various user requests. Those skilled in the art will recognize that the flowchart of FIG. 9 is intended only to represent a sampling of the various user selections and requests discussed above with respect to FIGS. 10 through 21. Other user requests may be processed generating a variety of display screens in accordance with design choices well known to those skilled in the art. The method described in FIG. 9 is therefore intended merely as exemplary of a preferred embodiment of some typical functions of the view client of the present invention. The view client aspect of the present invention is intended to broadly provide a variety of views of batch events, process events and continuous data from a batch process and the relationships of such event information in accordance with the S88 procedural model hierarchy.

Element 900 is first operable to display all batches known in the persistent object store. A batch is known if objects relating to a batch ID are found in the store. The known batches are initially displayed in the format of the batch overview display discussed above. Each batch is shown on a real time timeline as a Gantt chart bar. The Gantt chart bar for each batch is positioned horizontally on the timeline in accordance with the respective starting time and extends to a position determined by the respective ending time.

Scroll bars on the display allow the Gantt charts to be scrolled horizontally to view later or earlier times not presently displayed. A textual table under the Gantt chart timeline display provides a textual representation of the batch information associated with the corresponding batch. Scroll bars associated with the textual table allow viewing of detail not otherwise present on the display.

Element 902 then accepts a user request to provide additional detail regarding at least one of the displayed batches. As noted above, a batch is selected by the user clicking on the corresponding Gantt chart (or alternatively on the corresponding textual entry of the table). A pop-up menu or other user interface tool then accepts the user's request to present additional detail regarding the selected batch.

Element 904 then displays a batch detail screen as described above for the selected batch. As noted above, a default level of detail is determined by the user for display of the selected batch events and Gantt charts. In accordance with the default level of detail, procedures, corresponding unit procedures, corresponding operations and corresponding phases are displayed in Gantt chart bars aligned in accordance with their respective start times and extending in accordance with their respective end times. A hierarchically lower level Gantt chart is displayed under the corresponding higher level procedural element that contains it.

Element 906 then displays the textual table of event information corresponding to the presently selected batch Gantt charts. As noted above, scroll bars permit the user to scroll through additional data not presently on the display (both in table form or in Gantt chart form).

Element 908 then accepts user input to request a new display. If the user requests a return to the batch overview display, element 910 is operable to so detect and processing continues by looping back to element 900 as above. Otherwise processing continues with elements 912 through 934 to process a user request. As noted above, elements 912 through 934 are intended merely as exemplary of user requests that may be processed in accordance with the batch event history view client of the present invention. Those skilled in the art will recognize a wide variety of additional user requests and corresponding operations to display event information and associated continuous data in accordance with the relations determined by the batch history executive discussed above.

Elements 912 and 914 are operable to display a newly selected batch in response to a user request. The new batch is presented as discussed above with respect to element 904 and 906. Processing then continues by looping back to element 908 to await further user requests. If the user requested another operation, processing continues with element 916.

Elements 916 and 918 are operable to alter the level of detail displayed in the event detail display screens. As discussed above, a batch is initially displayed with a default level of detail selected by the user. As a user analyzes the displayed information, it may be useful to view more or less of the procedural hierarchy defined by the relationships determined by the batch history executive. Elements 916 and 918 respond to such requests by expanding or collapsing the hierarchy of displayed procedural elements as discussed above. Processing then continues by looping back to element 908 to await further user requests. If the user requested another operation, processing continues with element 920.

Elements 920 and 922 respond to a user request to display a second batch for comparison purposes. As noted above, it is often useful to display a second (or more) batches simultaneously on the user's display. Such a comparison display (with associated comparison textual tables) often helps a user visually identify important differences between batches. For example, a first batch may be a "golden" batch that produces known high quality product. The second batch may be one that produced inferior product. The reasons for such differences is often readily apparent from the Gantt chart timeline comparisons easily observed in the batch comparison display discussed above. Processing then continues by looping back to element 908 to await further user requests. If the user requested another operation, processing continues with element 924.

Elements 924 and 926 respond to a user request to alter the Gantt chart timeline from absolute time (real time) to batch relative time (time relative to the start of the batch process). As noted above, such timeline changes are often useful in conjunction with the batch comparison display to help align particular portions of multiple batches whose Gantt charts are being visually compared. Such alignment often helps to accentuate the critical differences that may explain quality issues regarding different batches. Processing then continues by looping back to element 908 to await further user requests. If the user requested another operation, processing continues with element 928.

Element 928 through 934 switch the display to a plot of continuous data associated with a selected event in response to a user request. Elements 930 and 932 display a set of requested continuous data point values selected by a user and corresponding to a selected batch event. The user may request a number of such data points and modify the selection until element 934 determines that the user wishes to return to the batch event detail display. At such time, processing continues by looping back to element 908 to await further user requests.

As noted above, those skilled in the art will recognize that the method of FIG. 9 is intended as one exemplary technique for user interaction to display batch event information and the relationships derived in such data by the executive. Display of such data in Gantt charts that also reflect the hierarchical nature of the relationships among the various data displayed is key to the view client of the present invention. Further, navigating through the various displays via selection of the hierarchical procedural elements of the batch procedure execution is a further key aspect of the present invention. Skilled software artisans will recognize a variety of equivalent implementations that provide these and other key aspects of the view client of the present invention.

While the invention has been illustrated and described in detail in the drawings and foregoing description, such illustrations and description is to be considered as exemplary and not restrictive in character, it being understood that only the preferred embodiment and minor variants thereof have been shown and described and that all changes and modifications that come within the spirit of the invention are desired to be protected.

What is claimed is:

1. An event historian system for batch processing, said event historian system comprising:
    a user interface system having a processor;
    a history executive element receiving process event information from one or more input sources operating in physical elements of a process and batch procedure event information that includes batch subprocedure event information from a batch control device, wherein the batch control device is separate from the physical element of the process, and automatically deriving relationships among portions of said process event information and batch subprocedure event information based on generated event messages to associate particular process event information with one or more particular batch subprocedures;
    a storage element coupled to said history executive element persistently storing said process event information and said batch procedure event information and said derived relationships in response to requests from said history executive element; and
    an event information retrieval element retrieving said process event information and said batch procedure event information in accordance with said derived relationships in response to requests from an application process.

2. The event historian system of claim 1 further comprising:
    a continuous data collection element gathering continuous data in real time wherein said continuous data relates to at least one procedural element of a batch process.

3. The event historian system of claim 2 wherein said information retrieval element further comprises:
    a batch historian view client application graphically presenting to a user said batch procedure event information and said derived relationships and said continuous data.

4. The event historian system of claim 1 wherein said information retrieval element further comprises:
    a batch historian view client application graphically presenting to a user said batch procedure event information and said derived relationships.

5. The event historian system of claim 1 further comprising:
- a batch event generator coupled to said history executive element as a first input source wherein said batch event generator generates events indicative of execution of procedural elements of a batch process; and
- a process event generator coupled to said history executive element as a second input source wherein said process event generator generates events indicative of elements performed within equipment used in the control of said batch process.

6. The event historian system of claim 5 further comprising:
- a continuous data collection element gathering continuous data in real time wherein said continuous data relates to at least one procedural element of a batch process,
- wherein said process event generator comprises:
- an event log generated by said continuous data collection element.

7. An event historian system for batch processing, said event historian system comprising:
- a user interface system having a processor;
- a history executive element receiving process event information from one or more input sources operating in physical elements of a process and batch procedure event information that includes batch subprocedure event information from a batch control device, wherein the batch control device is separate from the physical elements of the process, and automatically deriving relationships among portions of said process event information and batch subprocedure event information based on generated event messages;
- a storage element coupled to said history executive element persistently storing said process event information and said batch procedure event information and said derived relationships in response to requests from said history executive element; and
- an event information retrieval element retrieving said process event information and said batch procedure event information in accordance with said derived relationships in response to requests from an application process;
- a batch event generator coupled to said history executive element as a first input source wherein said batch event generator generates events indicative of execution of procedural elements of a batch process;
- a process event generator coupled to said history executive element as a second input source wherein said process event generator generates events indicative of elements performed within equipment used in the control of said batch process; and
- a continuous data collection element gathering continuous data in real time wherein said continuous data relates to at least one procedural element of a batch process, wherein
- said process event generator comprises an event log generated by said continuous data collection element; and
- said history executive element includes a history correlation element for relating said batch events and said process events and said continuous data.

8. A batch history view client system for batch processing, comprising:
- a user interface system having a computer processor including;
- means for retrieving batch procedure event information that includes batch subprocedure event information from a batch control device and process event information from one or more sources operating separate from the batch control device in physical elements of a process corresponding to an identified batch; and
- means for visually presenting to a user said batch procedure event information and process event information, and automatically deriving relationships among portions of said batch subprocedure event information and process event information to illustrate particular process event information as being associated with one or more particular batch subprocedures.

9. The view client system of claim 8 further comprising:
- means for retrieving other batch procedure event information corresponding to a second identified batch; and
- means for presenting to a user said other batch procedure event information and relationships among portions of said other batch procedure event information wherein said means for presenting said other batch procedure event information includes:
- means for indicating differences between said batch procedure event information and said other batch procedure event information.

10. The view client system of claim 9 wherein said other batch procedure event information represents processing of a golden batch for comparison with other batches represented by said batch procedure event information.

11. The view client system of claim 9 wherein said means for visually presenting includes means for presenting said batch procedure event information and said relationships in real time as said batch procedure event information is generated.

12. The view client system of claim 11 wherein said means for presenting said batch procedure event information in real time includes means for scrolling said batch procedure event information horizontally across a user display screen.

13. A batch history view client system for batch processing, comprising:
- a user interface system having a computer processor including:
- means for retrieving batch procedure event information from a batch control device and process event information from one or more sources operating separate from the batch control device in physical elements of a process corresponding to an identified batch; and
- means for visually presenting to a user said batch procedure event information and process event information and automatically deriving relationships among portions of said batch procedure event information and process event information; and
- means for presenting said batch procedure event information and process event information and said derived relationships as a Gantt chart wherein said Gantt chart is representative of procedural elements of the batch procedure.

14. The view client system of claim 13 wherein said means for presenting said batch procedure event information and process event information and said derived relationships as a Gantt chart further comprises:
- means for presenting said Gantt chart in an absolute time scale.

15. The view client system of claim 13 wherein said means for presenting said batch procedure event information and process event information and said derived relationships as a Gantt chart further comprises:
- means for presenting said Gantt chart in a batch relative time scale.

16. A batch history view client system for batch processing, comprising:
- a user interface system having a computer processor including;
- means for retrieving batch procedure event information that includes batch subprocedure event information from a batch control device and process event information from one or more sources operating separate from the batch control device in physical elements of a process corresponding to an identified batch;
- means for visually presenting to a user said batch procedure event information and process event information and automatically deriving relationships among portions of said batch subprocedure event information and process event information;
- means for retrieving other batch procedure event information corresponding to a second identified batch;
- means for presenting to a user said other batch procedure event information and relationships among portions of said other batch procedure event information; and
- continuous data collection means for gathering continuous data in real time;

wherein said continuous data relates to at least one data point of a batch process;
- wherein said means for presenting said other batch procedure event information includes means for indicating differences between said batch procedure event information and said other batch procedure event information and said means for visually presenting includes means for presenting said batch procedure event information and said relationships in real time as said batch procedure event information is generated, and wherein said means for presenting said batch procedure event information in real time includes means for presenting said continuous data in real time as said continuous data is gathered.

17. The view client system of claim 16 wherein said means for presenting said continuous data in real time includes means for scrolling said continuous data horizontally across a user display screen.

18. A batch history viewer for batch processing, comprising:
- a data access device that retrieves batch procedure event information that includes batch subprocedure event information from a batch control device and that retrieves process event information from one or more sources operating separate from the batch control device in physical elements of a process corresponding to an identified batch process;
- a display device that visually presents to a user indications of said batch procedure event information and process event information; and
- a routine that automatically derives relationships among portions of said batch subprocedure event information and process event information to be displayed to the user on the display device and to associate particular process event information with one or more particular batch subprocedures.

19. The batch history viewer of claim 18, further comprising a continuous data collection element that receives continuous data in real time wherein said continuous data relates to at least one procedural element of a batch process.

20. The batch history viewer of claim 19, wherein the display device includes a batch historian view client application that graphically presents to a user the batch procedure event information and said derived relationships and the continuous data related to at least one procedural element of the batch process.

21. The batch history viewer of claim 18, wherein the display device includes a batch historian view client application that graphically indicates one or more of the derived relationships between the batch procedure event information and the process event information.

22. The batch history viewer of claim 18, further comprising a batch event generator coupled to the data access device as a first input source wherein the batch event generator generates batch events indicative of execution of procedural elements of a batch process and a process event generator coupled to the data access device as a second input source wherein said process event generator generates process events indicative of elements performed within equipment used in the control of said batch process.

23. The batch history viewer of claim 22, furthering comprising a continuous data collection element that collects continuous data in real time related to at least one procedural element of a batch process and wherein the process event generator comprises an event log generated by the continuous data collection element.

24. The batch history viewer of claim 23, further including a history correlation element that relates the batch events and said process events and said continuous data.

25. The batch history viewer of claim 22, furthering comprising a continuous data collection element that collects continuous data in real time related to at least one procedural element of a batch process and wherein the display device presents the continuous data in real time as said continuous data is gathered.

26. The batch history viewer of claim 18, wherein the display device presents the batch procedure event information and the process event information and the derived relationships as a Gantt chart.

27. The batch history viewer of claim 26, wherein the display device presents the Gantt chart in an absolute time scale.

28. The batch history viewer of claim 26, wherein the display device present the Gantt chart in a batch relative time scale.

29. The batch history viewer of claim 18, wherein the display device present the batch procedure event information and the derived relationships in real time as said batch procedure event information is collected.

30. The batch history viewer of claim 18, wherein the display device present the batch procedure event information in real time by scrolling the batch procedure event information horizontally across a user display screen.

31. The batch history viewer of claim 18, wherein the batch procedure event information includes S88.01 standard batch procedure categories.

* * * * *

UNITED STATES PATENT AND TRADEMARK OFFICE
CERTIFICATE OF CORRECTION

| | | |
|---|---|---|
| PATENT NO. | : 7,249,356 B1 | Page 1 of 1 |
| APPLICATION NO. | : 09/302687 | |
| DATED | : July 24, 2007 | |
| INVENTOR(S) | : Wilson et al. | |

It is certified that error appears in the above-identified patent and that said Letters Patent is hereby corrected as shown below:

In the Claims:

At Column 26, line 23, "furthering" should be -- further --.

At Column 26, line 46, "present" should be -- presents --.

At Column 26, line 49, "present" should be -- presents --.

At Column 26, line 53, "present" should be -- presents --.

Signed and Sealed this

Twentieth Day of May, 2008

JON W. DUDAS
*Director of the United States Patent and Trademark Office*